United States Patent [19]
Ackley

[11] Patent Number: 5,486,689
[45] Date of Patent: Jan. 23, 1996

[54] METHOD AND APPARATUS FOR DECODING UNRESOLVED MULTI-WIDTH BAR CODE SYMBOLOGY PROFILES

[75] Inventor: H. Sprague Ackley, Seattle, Wash.

[73] Assignee: Intermec Corporation, Everett, Wash.

[21] Appl. No.: 327,972

[22] Filed: Oct. 24, 1994

Related U.S. Application Data

[63] Continuation-in-part of Ser. No. 8,769, Jan. 22, 1993, Pat. No. 5,389,770.

[51] Int. Cl.⁶ .................................................... G06K 7/10
[52] U.S. Cl. ...................... 235/463; 235/462; 235/470; 235/494
[58] Field of Search .................................. 235/463, 470, 235/462, 494

[56] References Cited

U.S. PATENT DOCUMENTS

| | | | |
|---|---|---|---|
| 1,985,035 | 12/1934 | Kermode et al. | 209/111 |
| 2,612,994 | 10/1952 | Woodland et al. | 209/111 |
| 3,359,405 | 12/1967 | Sundblad | 235/61.11 |
| 3,622,758 | 11/1971 | Schanne | 235/61.11 E |
| 3,784,792 | 1/1974 | Dobras | 235/61.11 E |
| 4,013,893 | 3/1977 | Hertig | 250/568 |
| 4,056,710 | 11/1977 | Shepardson et al. | 235/437 |
| 4,379,224 | 4/1983 | Engstrom | 235/463 |
| 4,687,942 | 8/1987 | Takagi et al. | 250/556 |
| 4,916,298 | 4/1990 | Raphaël | 235/463 |
| 4,980,544 | 12/1990 | Winter | 235/436 |
| 5,080,456 | 1/1992 | Katz et al. | 359/214 |
| 5,097,263 | 3/1992 | Delpech et al. | 341/155 |
| 5,231,293 | 7/1993 | Longacre, Jr. | 250/568 |
| 5,276,315 | 1/1994 | Surka | 235/462 |

FOREIGN PATENT DOCUMENTS

| | | | |
|---|---|---|---|
| 0262924 | 4/1988 | European Pat. Off. | G06K 7/10 |
| 0385783 | 9/1990 | European Pat. Off. | G06K 7/14 |
| 2635207 | 2/1990 | France | G06L 15/66 |
| WO88/02521 | 4/1988 | WIPO | G06K 7/10 |

OTHER PUBLICATIONS

X3 Secretariat, Computer and Business Equipment Manufacturers Association (eds.), *ANSI X3.182–1990 Bar Code Print Quality Guideline*, American National Standards Institute, New York, 1990, pp. 1–28. * Month is missing.

Barkan, Eric and David Sklar, "Effects of Substrate Scattering on Bar–Code Scanning Signals," *SPIE 362*:196–212, 1982. * month is missing.

Barkan, Eric and Jerome Swartz, "Depth of Modulation and Spot Size Selection in Bar Code Laser Scanners," *SPIE'S 25th Annual International Technical Symposium*, San Diego, Calif., Aug. 24–Aug. 28, 1981, pp. 1–15.

Intermec, *Substrate Distortion—Historical Papers by IBM and RCA*, Rev. A, Dec. 4, 1991, Nicastro, L. J. "Report on Unsymmetrical Signals in the Supermarket Scanner," pp. 1–5, Jan. 21, 1970, and The Shrinking White Bar Effect Observed in the Piranha Bar Code Scanner, pp. 1–10, Apr. 10, 1973.

*Primary Examiner*—John Shepperd
*Assistant Examiner*—Michael G. Lee
*Attorney, Agent, or Firm*—Seed and Berry

[57] ABSTRACT

A method and apparatus for decoding profiles which fail to resolve narrow elements in multi-width symbols, first begins by identifying which elements in the profile are resolved. Second, the distances between the centers of the resolved elements are determined. Third, closure boundaries are determined, and the widths of resolved elements are determined at the closure boundary. The type of resolved element is determined based on its measured width. Thereafter, a unit distance is determined for 1-wide narrow elements unresolved in the profile. Based on the unit distance and the width of two adjacent resolved elements, a matrix is constructed for determining the number of narrow elements unresolved between two resolved elements. Based on the measured center distances, the resolved element widths and the matrix, all of the unresolved narrow elements are identified in the profile and the profile is subsequently decoded.

53 Claims, 14 Drawing Sheets

| | | | | | | | | | | | | | | | | | | | | | | | | | |
|---|---|---|---|---|---|---|---|---|---|---|---|---|---|---|---|---|---|---|---|---|---|---|---|---|---|
| Measured Center Distance Between Resolved Element Pairs | 49 | 23 | 35 | 18 | 18 | 27 | 17 | 18 | 44 | 50 | 22 | 35 | 18 | 17 | 74 | 23 | 39 | 23 | 43 | 21 | 39 | 39 | 18 | 18 | 17 | 31 | 22 | 62 |
| Measured Width of Resolved Element* | 25 | −11 | 15 | −12 | 14 | 15 | −10 | 18 | −29 | 27 | −11 | 18 | −10 | 16 | −2 | 15 | −20 | 17 | −16 | −20 | 15 | −12 | 15 | −10 | −20 | 17 |
| Size of Resolved Element* | 3 | −2 | 2 | −2 | 2 | 2 | −2 | 2 | −4 | 3 | −2 | 2 | −2 | 2 | −3 | 2 | −3 | 2 | −3 | −3 | 2 | −2 | 2 | −2 | −3 | 2 |
| Number of Unresolved 1-Width Elements Lost Between Resolved Elements | 3 | 0 | 2 | 0 | 0 | 1 | 0 | 0 | 2 | 2 | 0 | 2 | 0 | 0 | 6 | 0 | 2 | 0 | 2 | 0 | 2 | 0 | 0 | 1 | 0 | 5 |
| Resulting String of Element Widths | 111 3 | 2 11 2 | 2 | 2 11 2 | 2 | 2 1 2 | 2 | 2 | 2 111 4 11 3 | 2 11 2 | 2 11 2 | 2 11 2 | 2 | 2 111111 3 | 2 11 3 | 2 11 3 | 2 11 3 | 2 11 3 11 2 | 2 | 2 | 2 1 3 | 2 111111 |

124 — Measured Center Distance Between Resolved Element Pairs
126 — Measured Width of Resolved Element*
128 — Size of Resolved Element*
130 — Number of Unresolved 1-Width Elements Lost Between Resolved Elements
132 — Resulting String of Element Widths

| String of Elements Parsed into Characters | 1 | 1 | 1 | 3 | 2 | 1 | 1 | 2 | 2 | 2 | 1 | 2 | 2 | 2 | 1 | 1 | 1 | 4 | 1 | 1 | 3 | 2 | 1 | 1 | 1 | 2 | 2 | 1 | 1 | 2 | 1 | 1 | 3 | 2 | 1 | 1 | 1 | 3 | 1 | 1 | 2 | 2 | 2 | 1 | 1 | 1 | 3 | 2 | 1 | 1 | 1 | 3 | 2 | 1 | 1 | 1 | 1 |

134

*A POSITIVE VALUE INDICATES A SPACE (HIGH REFLECTANCE) WHILE A NEGATIVE VALUE INDICATES A BAR (LOW REFLECTANCE).

FIG. 15

METHOD AND APPARATUS FOR DECODING UNRESOLVED MULTI-WIDTH BAR CODE SYMBOLOGY PROFILES

CROSS-REFERENCE TO RELATED APPLICATIONS

This application is a continuation-in-part of application Ser. No. 8/008,769, filed Jan. 22, 1993 now U.S. Pat No. 5,389,770, entitled "METHOD AND APPARATUS FOR DECODING UNRESOLVED BAR CODE PROFILES."

TECHNICAL FIELD

The present invention relates to methods and apparatus for decoding profiles produced from machine-readable symbols, and more particularly, to methods and apparatus for decoding unresolved profiles.

BACKGROUND OF THE INVENTION

Bar code symbologies ("bar codes") are widely used for data collection. The first bar code symbologies developed, such as U.P.C., EAN, Code 39, Interleaved 2 of 5, and Code 93 can be referred to as "linear symbologies" because data in a given symbol is decoded along one axis or direction. Linear symbologies generally encode data characters as parallel arrangements of alternating, multiple-width strips of lower reflectivity or "bars" separated by the absences of such strips having higher reflectivity or "spaces." Each unique pattern of bars and spaces within a predetermined width defines a particular data character. A given linear symbol encodes several data characters along its length as several groups of unique bar and space patterns.

Simpler linear symbologies such as Code 39 employ two element widths. An "element" is a single bar or a single space, and in 2-width symbologies, each character in the symbology generally includes a combination of four narrow and wide elements: a single-width bar, a single-width space, a double-width bar or a double-width space. More complex symbologies employ a greater number of widths for each element. For example, the U.P.C. symbology employs four widths, thus allowing for a combination of eight elements. Nevertheless, each linear symbology is based on its "X dimension," which is the nominal width dimension of the narrowest bars and spaces in the bar code symbology. The wider bars and spaces in that symbology are based on integer multiples of the X dimension. For example, the largest element in the U.P.C. symbology is four times wider than the narrowest element.

Currently available bar code readers transmit light to a bar code, which is reflected back to a light sensor within the reader. The sensor produces a profile based on the light reflected from the bar code. The bar code "profile" is generally an analog signal representing the modulated light reflected from the spaces and absorbed by the bars in the bar code and thereby represents the pattern of bars and spaces in a given bar code. In a given profile, a peak generally corresponds to a space (high reflectivity), while a valley corresponds to a bar (low reflectivity, relative to a space), and the width of each peak or valley generally indicates the width of the corresponding bar or space whose reflectance produced the peak or valley. Currently available readers determine the edges in the profile, typically using an electronic thresholding or other square-wave generating circuit that converts the profile into either a high or low value. The reader then decodes the "squared-off" signal based on the transitions or edges between high and low values.

Some bar code readers employ hand-held wands which contact the surface on which the bar code is printed. Such readers often produce profiles having sharp contrast between the peaks and valleys and thus the spaces and bars represented by the profile are easily detectable by circuitry in the reader. However, wand-type readers require the wand to contact the surface on which the bar code is printed, and are thus impractical in situations where a user cannot or does not wish to physically contact the bar code. In a handheld reader, requiring the user to manually contact each bar code is time consuming and reduces productivity.

Non-contact bar code readers are currently available such as laser scanning and image-based readers. Laser scanning-type readers employ a scanning beam of laser light which impinges on and is reflected from a bar code. A photodetector receives the reflected light and converts it into a modulated electrical signal that comprises the profile for the bar code. Image or vision-based readers employ charge-coupled devices ("CCCD"), two-dimensional semiconductor arrays, vidicons, or other suitable light receiving elements that receive an image of a bar code and, based on the light reflected therefrom, process the image to produce a profile.

Due to optical systems inherent in laser- or image-type readers, these readers have a specified depth-of-field within which bar codes can be read. Some laser or image-type readers employ autofocus systems to increase the depth-of-field for the reader. However, even readers with autofocus systems are limited by the depth-of-field of the autofocus system. Additionally, autofocus systems are costly.

If a reader scans or images a bar code out of its depth-of-field, the resulting profile will exhibit "closure." Positive ink spread in a bar code or excessive noise in a profile can also produce closure. Closure in a bar code profile is evidenced by some recognizable peaks and valleys, but also ripples in the middle of the profile. Closure in a bar code profile generally indicates that the wide elements in the profile are resolved, but that the narrow elements are unresolved. With respect to readers, a space or bar is "resolved" if the reader is able to identify a peak or valley in the profile that corresponds to the given space or bar. Some profiles may represent narrow elements by small peaks, valleys or ripples that are visually recognizable, but which are essentially undetectable by current readers.

Currently available readers are unable to decode profiles having closure. These readers employ electronic circuits such as thresholding circuits, or other methods, to find the edges of bar code elements represented in a profile. To decode each element in the bar code, these electronic circuits locate an edge of an element as a point where. e.g., the reflectance in the profile reaches a fixed distance from a peak or valley. Currently available readers cannot decode profiles where the narrow elements are out of focus or lost in the profile (i.e., profile closure) because the narrow elements fail to produce any significant peaks or valleys and thus the electronic circuitry is unable to locate any edges in the profile corresponding to these elements. Since current electronic circuits cannot locate the narrow elements in a profile (when closure occurs), the circuits cannot decode the bar code.

Due to the shortcomings of such circuits, a user of a handheld non-contact reader without autofocus must adjust the distance at which the user holds the reader from the bar code until the bar code is within the depth-of-field (i.e., in-focus) for the reader. Once in-focus, the circuitry can decode the bar code. If a user is attempting to read bar codes at varying distances, the user must constantly move the reader to place a given bar code within focus for the reader so as to read that bar code. Consequently, while non-contact readers eliminate the need to contact the surface on which the bar codes is printed, reading each bar code is still time consuming since the user must move the reader to the particular in-focus position for the reader. If the reader is mounted in a fixed location (and lacks autofocus capabilities), and the bar codes pass by the reader at different distances, for example, when the reader is mounted above a conveyor on which boxes of varying heights are carried for reading bar codes atop the boxes, only those bar codes within the reader's fixed depth-of-field will be decoded.

Overall, the inventor is unaware of a method or apparatus for decoding profiles from various types of bar code symbologies when such profiles exhibit closure due to, e.g., symbols being read outside of the reader's depth-of-field, noise generated from electronics or printing defects, or when a given reader attempts to read symbols having an X-dimension smaller than that capable of being read by the reader.

SUMMARY OF THE INVENTION

As represented in the claims below, the present invention, in a broad sense, embodies a method of decoding a machine-readable symbol representing encoded information, the symbol including a plurality of spaced two-dimensional geometric shapes, the shapes and spaces between the shapes having at least first, second and third widths in at least one direction. The second and third widths are greater than the first width. The method includes the steps of: (i) receiving light reflected from the symbol and producing an output signal therefrom that represents the reflectance of the shapes and spaces comprising the symbol; (ii) receiving the output signal and producing a wide feature signal that resolves at least some of the shapes and spaces having the second and third widths, but which fails to resolve at least some of the shapes and spaces having a first width; (iii) receiving the wide feature signal and determining which of the shapes and spaces are resolved by identifying a plurality of portions in the wide feature signal that correspond to the resolved shapes and spaces; (iv) generating a lost element matrix in response to the wide feature signal; and (v) determining the information encoded in this symbol based on the lost element matrix.

Similarly, the present invention embodies an apparatus for decoding the machine-readable symbol. The apparatus includes a sensor that receives light that is reflected from the machine-readable symbol and produces an output signal therefrom that represents the reflectance of the shapes and spaces comprising the symbol. A receiver receives the output signal and produces a large shape signal that indicates at least some of the shapes and spaces having the second or third widths, but fails to produce a signal indicative of at least some of the shapes and spaces having the first width. A processor processes the large shape signal and produces a signal indicative of the information included in the symbol. The processor: (i) determines which of the shapes and spaces are resolved by identifying a plurality of portions in the large shape signal that each correspond to one of the resolved shapes and spaces, (ii) generates a lost element matrix in response to the large shape signal, and (iii) produces a signal indicative of the information encoded in the symbol based on the lost element matrix.

Other features and associated advantages of the present invention will become apparent from studying the following detailed description, together with the accompanying drawings.

BRIEF DESCRIPTION OF THE DRAWINGS

FIG. 15 is a table showing an example of the intermediate values determined during the steps shown in the flowchart of FIGS. 11A and 11B for the method of decoding unresolved profiles.

DETAILED DESCRIPTION OF THE PREFERRED EMBODIMENT

Figure 1:
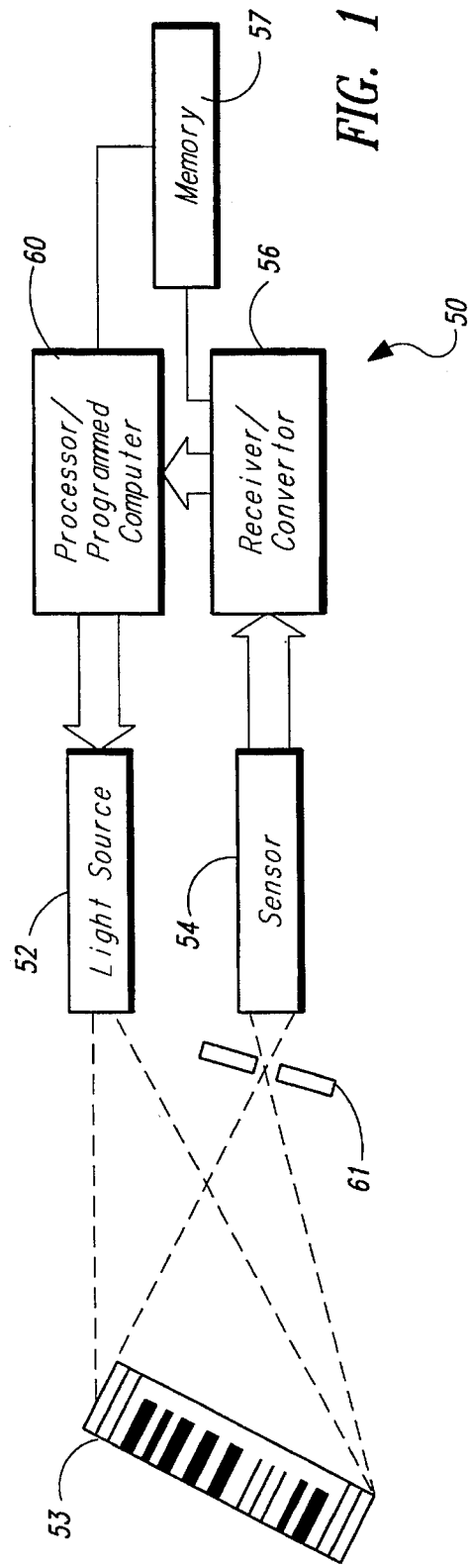
FIG. 1 shows a block diagram of a data collection symbology reader of the present invention.

As shown in FIG. 1, a data collection symbology reader 50 of the present invention includes a light source 52 that illuminates a data collection or bar code symbol 53. As used herein, a "data collection symbol" refers to a symbol from any linear, stacked, area and other machine readable symbology. A stacked symbology, as used herein, refers to any symbology, such as PDF417, that generally employs several adjacent rows of symbols, each row having several characters defined by groups of multiple-width bars and spaces. An area symbology, as used herein, refers to any symbology, such as Data Matrix or Code One, that employs a matrix of data cells, rather than one or more rows of bars and spaces.

A sensor 54 in the reader 50 receives the light reflected from the bar code 53 and converts the received light into an electrical signal. For example, the light source 52 can be a laser while the sensor 54, in turn, can be a photodetector. Alternatively, the light source 52 can be an LED, flash bulb, infrared light source, or other light-emitting element, while the sensor 54 can be a CCD, semiconductor array, vidicon, or other area imager capable of converting received light into electrical signals.

A receiver or converter 56 receives the electrical signal from the sensor 54 and converts it into a signal to be processed by a programmed computer or processor 60. Typically, the sensor 54 produces an analog signal that represents the modulated light reflected from the elements in the bar code 53. Importantly, if the processor 60 is a digital computer, then the converter 56 converts the profile from an analog signal produced by the sensor 54 to a multi-level digital signal that numerically represents the various amplitudes of the analog signal. The converter 56 and/or processor 60 are coupled to memory 57 for storing the profile in digital form.

The sensor 54 produces a profile such as those shown in FIGS. 2B through 10, depending upon the modulated light received from the symbol 53 and the size of an aperture 61 preceding the light detector in the sensor. The vertical scale in most profiles is percent reflectance ranging from 0% to 100%. The horizontal scale in most profiles is not known absolutely, but rather is in relative units, such as distance across the symbol or time. When decoding a profile, it is not necessary to know the horizontal spacing in measurement units, but rather the relative widths or distances between elements represented by peaks or valleys in the profile.

In most readers, the aperture 61 is smaller than the minimum size of an element (i.e., the X dimension) in a data collection symbol to be read by the reader so as to produce a profile that adequately resolves all elements in the symbol. FIG. 2B, however, shows a closure profile produced by an aperture 61 that is greater than 2 times the X dimension for the symbol 53 (i.e., greater than 2X). Most bar code readers employ a circular aperture 61 whose diameter is equal to approximately 0.8X. The symbol 53, from which the profile of FIG. 2B was produced, is an enlarged copy of about a 13 mil. U.P.C.-A symbol printed by a marginal quality impact dot matrix printer, and thus has considerable positive ink spread. In addition to large apertures 61, marginal print quality further promotes closure in profiles.

Figure 2A:
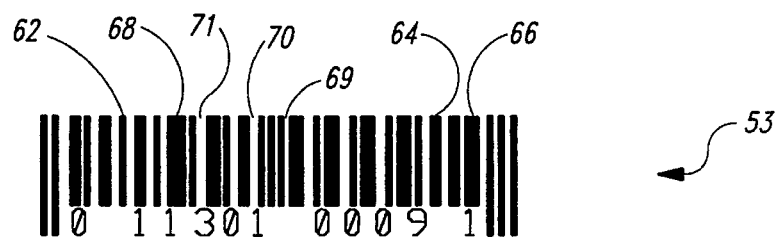
FIG. 2A shows an enlarged U.P.C.-A symbol.
Figure 2B:
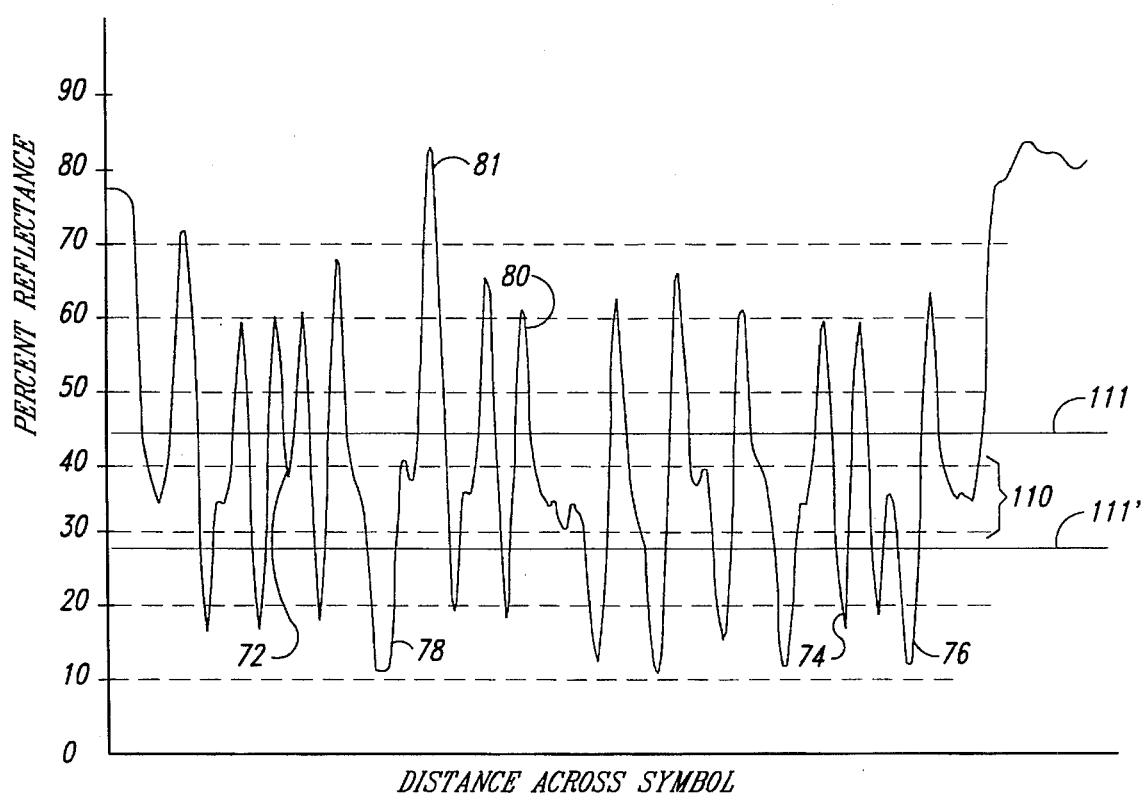
FIG. 2B shows an example of an unresolved profile of the symbol of FIG. 2A produced by the reader of FIG. 1 having an aperture of approximately 2.5 times the X dimension for the symbol.

As identified in FIG. 2A, the symbol 53 includes a 1-wide bar 62, a 2-wide bar 64, a 3-wide bar 66 and a 4-wide bar 68, and a 1-wide space 69, a 2-wide space 70 and a 3-wide space 71. The symbol 53 lacks any 4-wide spaces. The 2-, 3- and 4-wide bars 64, 66 and 68 in FIG. 2A produce valleys 74, 76 and 78 shown in FIG. 2B, respectively, that all have less than 20% reflectance. Conversely, the 2- and 3-wide spaces 70 and 71 produce peaks 80 and 81, respectively, that are both greater than 55% reflectance. The 1-wide bar 62, however, produces a valley 72 having a reflectance substantially greater than 20%, while the 1-wide space 69 fails to produce any recognizable peak, and thus the 1-wide elements are unresolved in the profile of FIG. 2B.

In general, the unresolved 1-wide or "narrow" elements in a closure profile are represented, if at all, by small peaks, valleys, inflection points or other ripples in the middle of the profile. Conversely, the resolved 2-, 3- and 4-wide or "wide" elements are represented by high peaks or low valleys, extending near the top or bottom of the profile. As shown in FIG. 2B, for example, the high peaks rise to approximately 65% reflectance and the low valleys dip to about 15% reflectance, corresponding to the resolved wide spaces and bars in the symbol 53, respectively. As a result, if two wide elements, such as a wide bar and a wide space, are separated by two narrow elements (i.e., a 1-wide space or a 1-wide bar), the resulting closure profile shows a high peak and a low valley that appear to be adjacent to each other in the profile. The narrow elements fail to produce any significant peak or valley because the adjacent wide elements have a large reflectance difference relative to the contrast of the narrow elements. Consequently, the narrow elements fail to produce a substantial enough light or dark image, to in turn, produce a significant peak or valley in the profile. Instead, the narrow elements produce a gray image, which in turn, produces an insignificant ripple at the middle of the profile.

Similarly, if a wide bar is separated from another wide bar by a single narrow element (i.e., a 1-wide space), the resulting closure profile shows two high peaks that appear to be adjacent to each other in the profile. The narrow element fails to produce any significant peak because the adjacent wide elements have a large reflectance difference relative to the contrast of the narrow element. Consequently, the narrow element fails to produce a substantial enough light image to in turn produce a significant peak in the profile.

Figure 3:
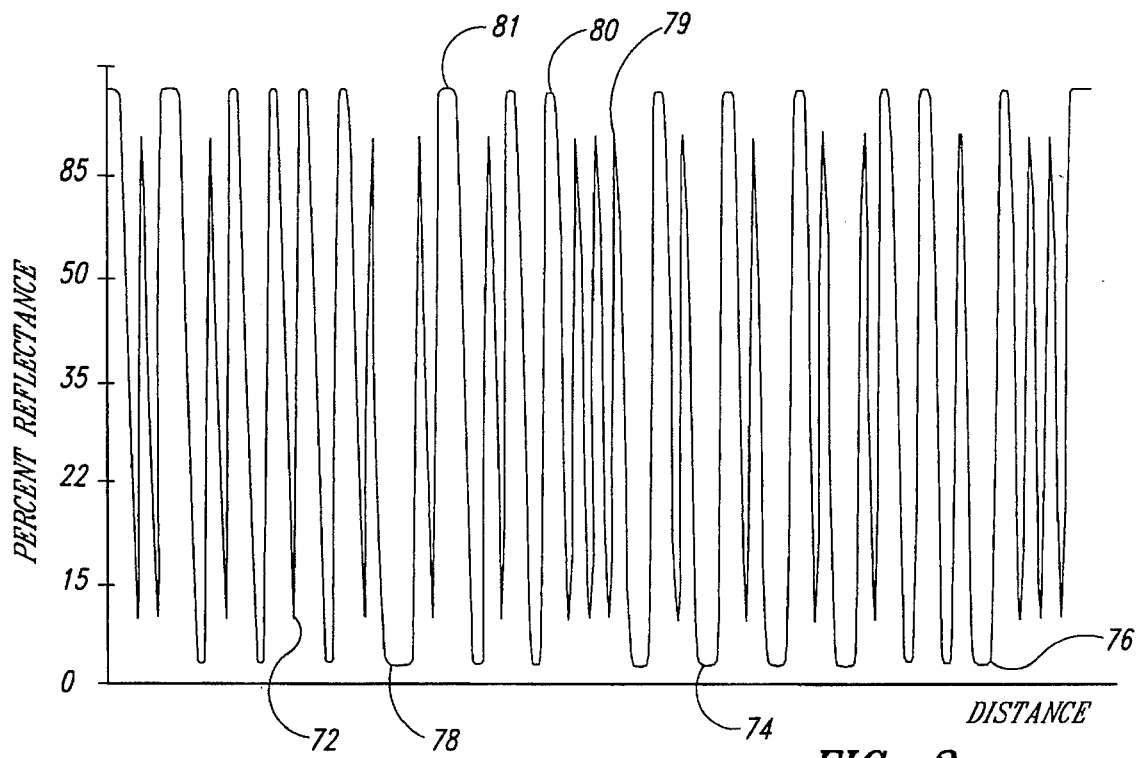
FIG. 3 is an example of a resolved profile of the symbol of FIG. 2B produced by the reader of FIG. 1 having an aperture of 0.8 times the X dimension of the symbol.
Figure 4:
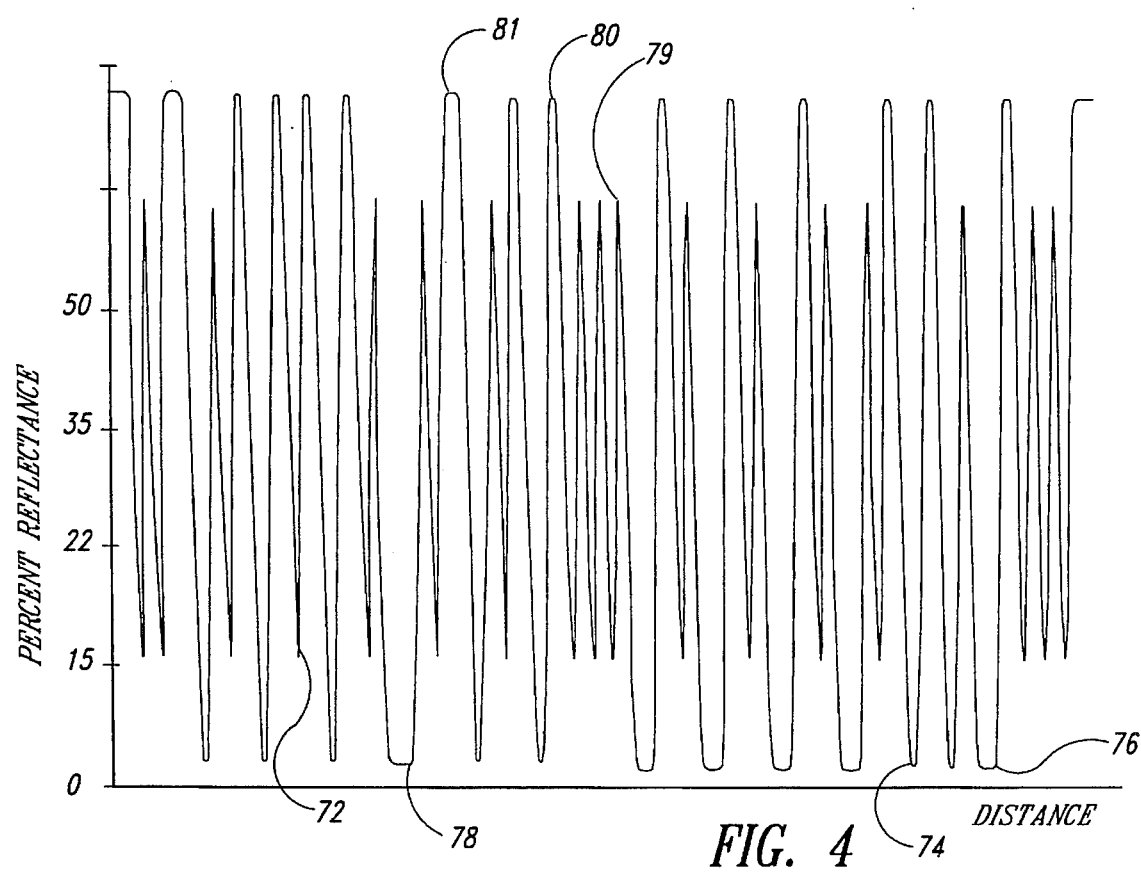
FIG. 4 is an example of a profile of the symbol of FIG. 2B produced by the reader of FIG. 1 having an aperture of 1.0 times the X dimension of the symbol.
Figure 5:
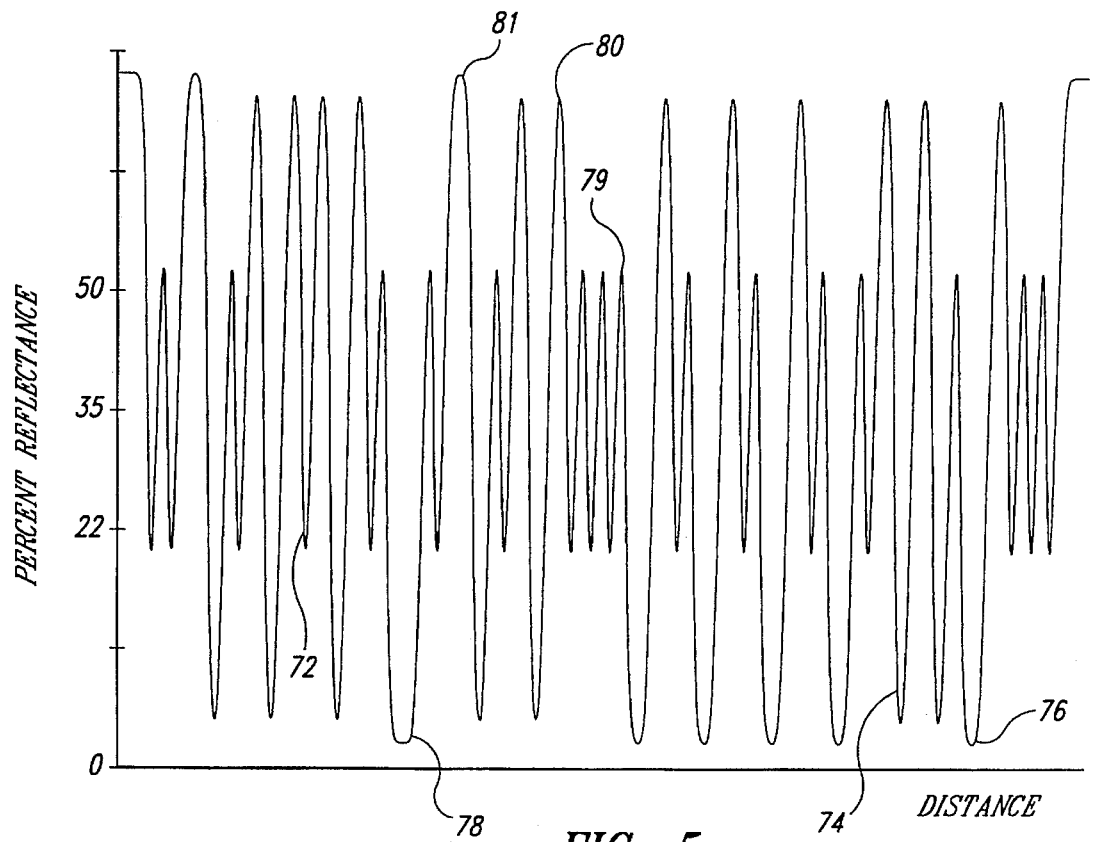
FIG. 5 is an example of a profile of the symbol of FIG. 2B produced by the reader of FIG. 1 having an aperture of 1.33 times the X dimension of the symbol.

FIGS. 3 through 10 illustrate how the 1-wide elements in the symbol 53 become unresolved or "lost" in profiles produced by the sensor 54 as its aperture 61 increases from 0.8X to 3.0X. FIG. 3 shows a fully resolved profile produced from the symbol 53 with an aperture 61 at 0.8X for the sensor 54. As shown in FIG. 3, the 1-, 2-, 3- and 4-wide bars 62, 64, 66 and 68 of the symbol 53 produce valleys 72, 74, 76 and 78 all having less than 20% reflectance, while the 1-, 2- and 3-wide spaces 69, 70 and 71 produce peaks 79, 80 and 81 all having greater than 60% reflectance, all respectively.

The symbol 53, a U.P.C.-A symbol, includes 59 elements, which are represented by 60 sharp or steep transitions in the profile of FIG. 3 that define the edges of the elements. Importantly, all of the valleys in the profile of FIG. 3 are distinct from all of the peaks, and thus standard decoding circuitry can locate the transitions from valleys to peaks in the profile in FIG. 3. By locating the transitions from valleys to peaks, standard decoding circuitry can identify the edges of each of the elements in the profile and thereby decode the profile.

Figure 6:
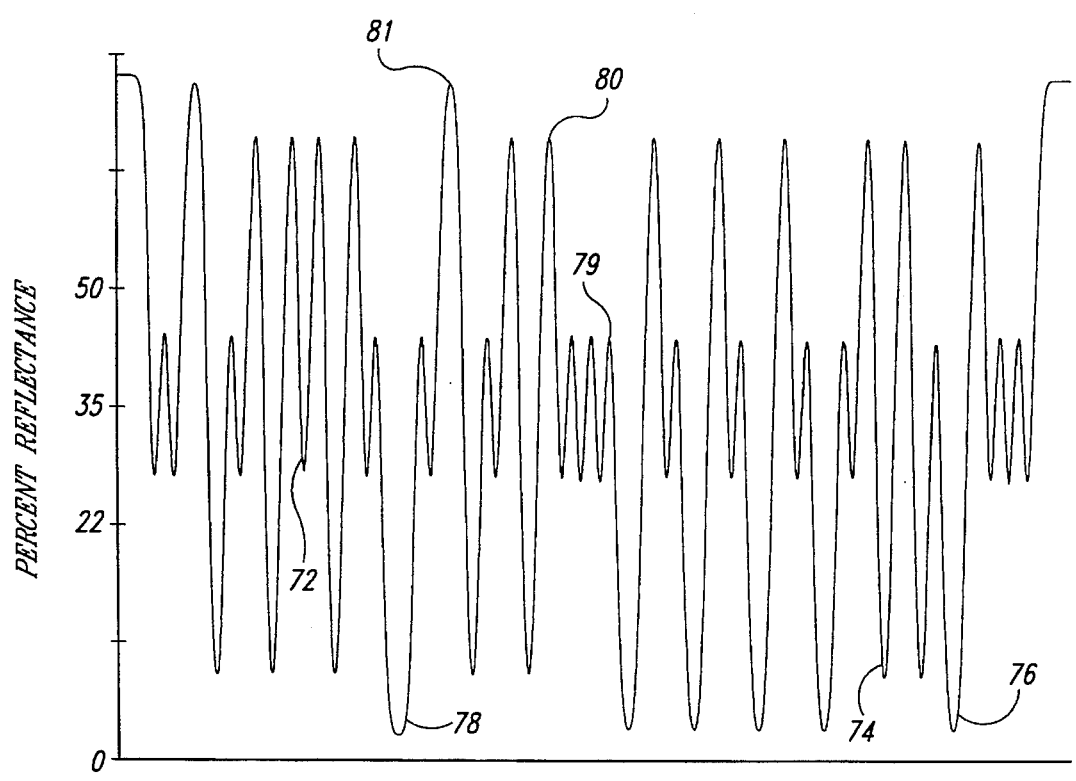
FIG. 6 is an example of a profile of the symbol of FIG. 2B produced by the reader of FIG. 1 having an aperture of 1.67 times the X dimension of the symbol.
Figure 7:
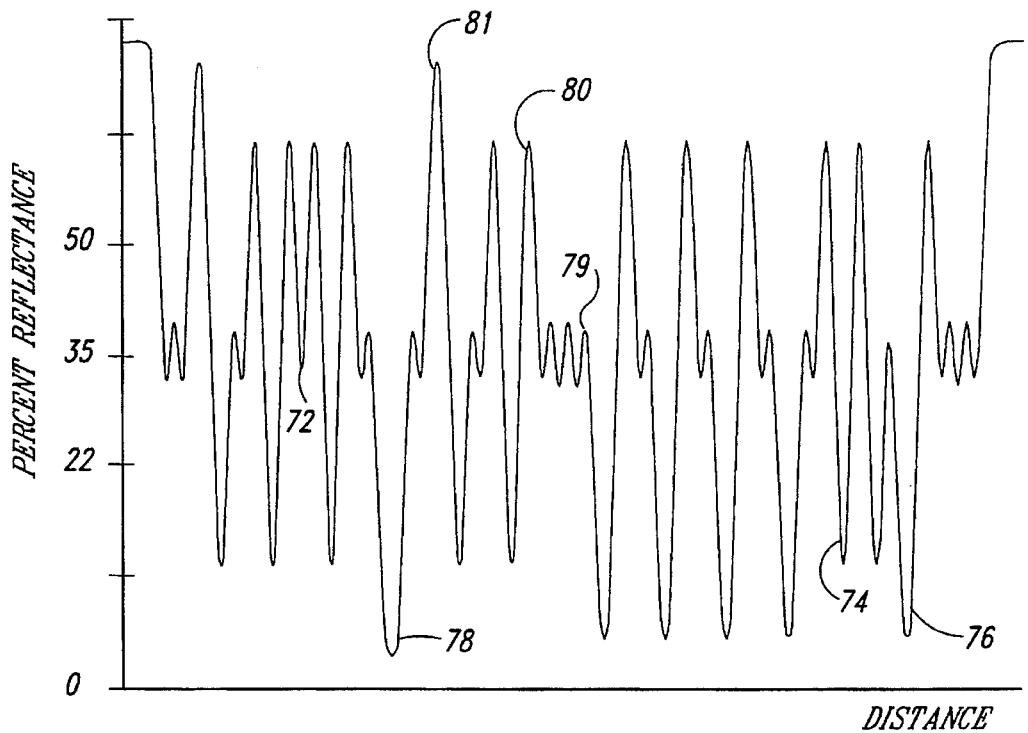
FIG. 7 is an example of a profile of the symbol of FIG. 2B produced by the reader of FIG. 1 having an aperture of 2.0 times the X dimension of the symbol.
Figure 8:
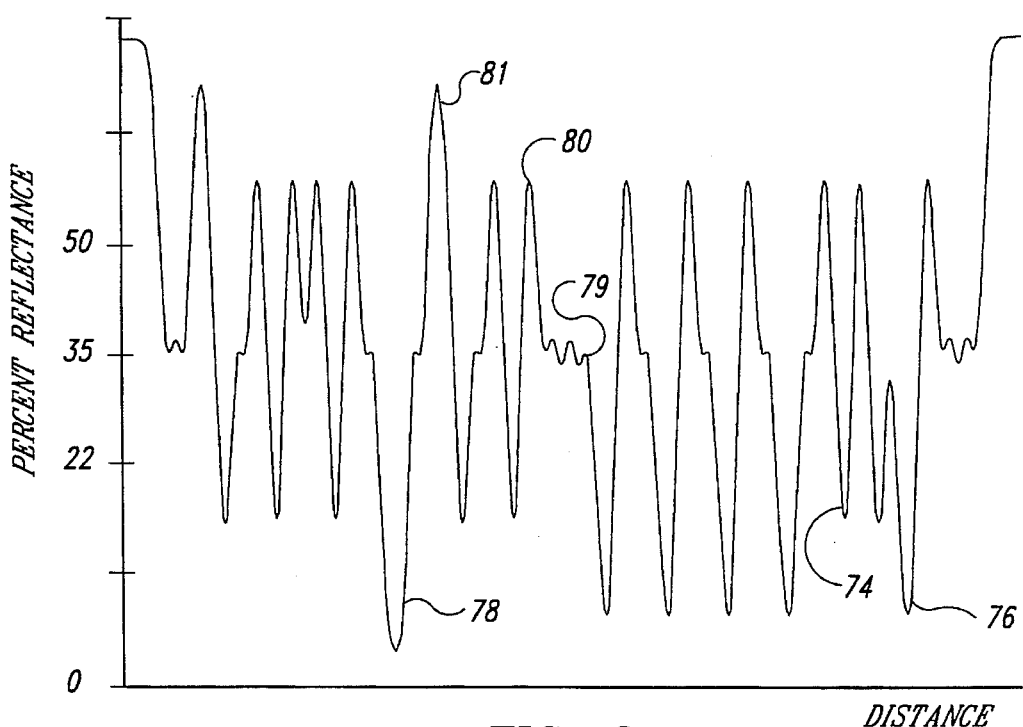
FIG. 8 is an example of a profile of the symbol of FIG. 2B produced by the reader of FIG. 1 having an aperture of 2.33 times the X dimension of the symbol.
Figure 9:
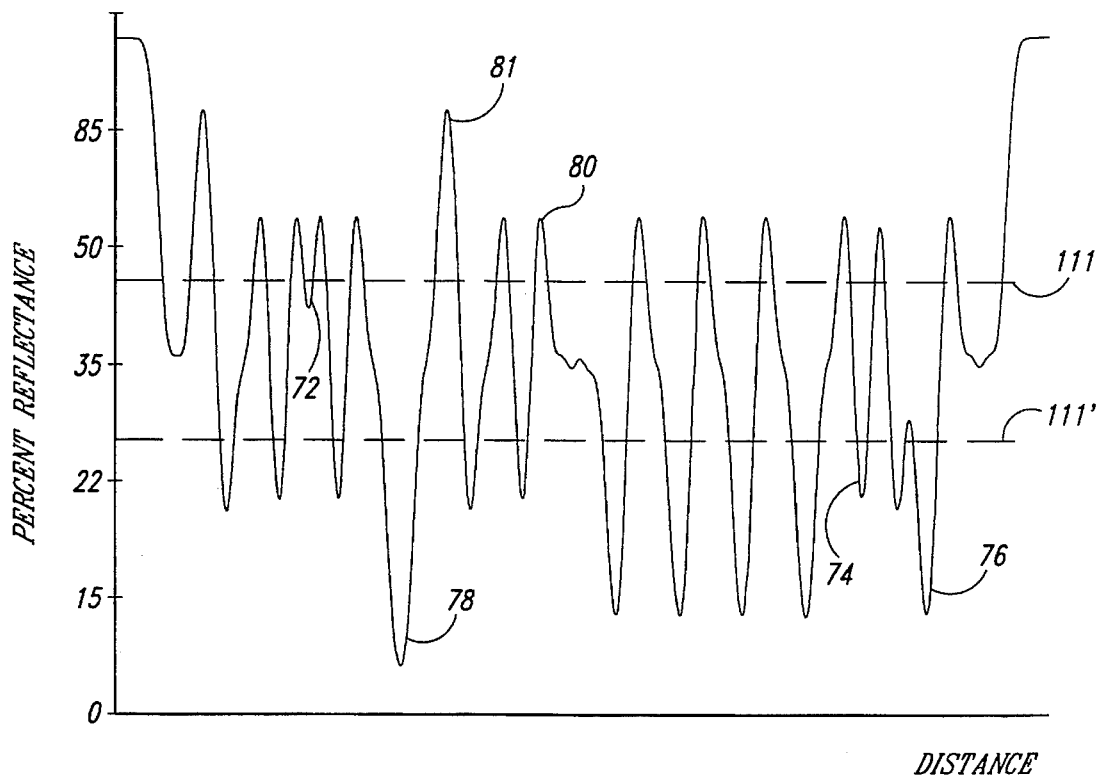
FIG. 9 is an example of a profile of the symbol of FIG. 2B produced by the reader of FIG. 1 having an aperture of 2.67 times the X dimension of the symbol.
Figure 10:
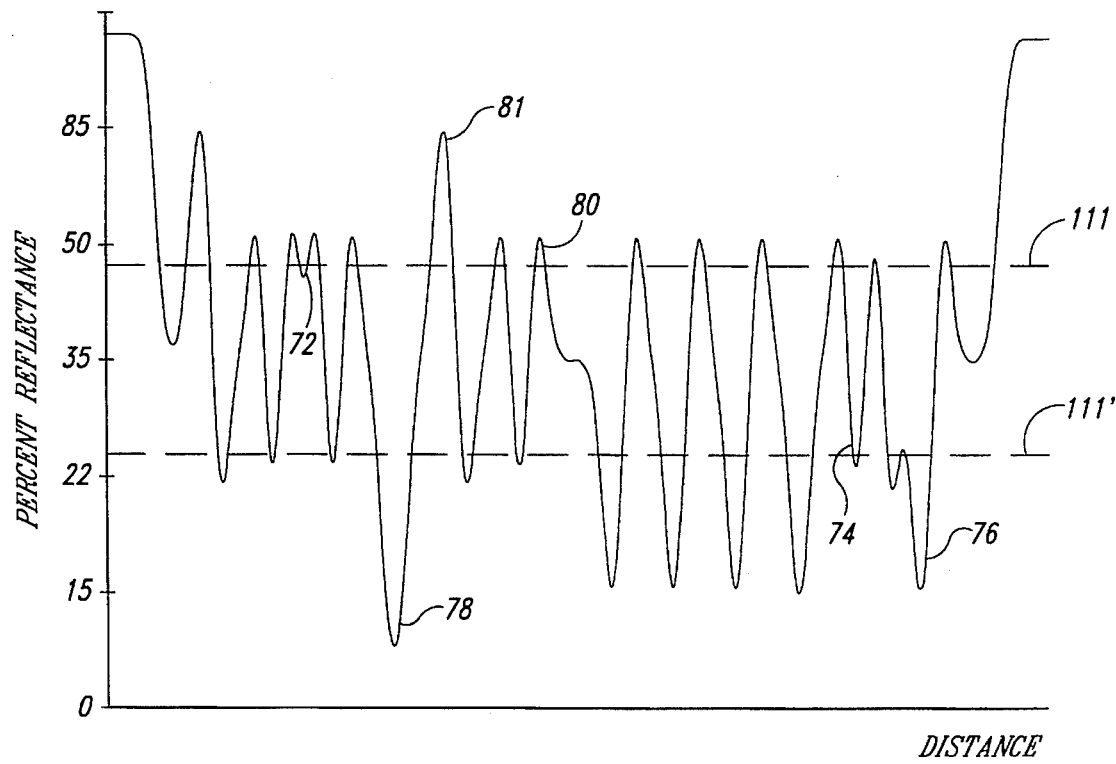
FIG. 10 is an example of a profile of the symbol of FIG. 2B produced by the reader of FIG. 1 having an aperture of 3.0 times the X dimension of the symbol.

FIGS. 4 through 10 demonstrate that as the size of the aperture 61 in the reader 50 increases from 1.0X to 3.0X, and thus the symbol 53 becomes more out-of-focus, the 1-wide bar 62 and the 1-wide space 69 produce respective valleys 72 and peaks 79 of decreasing amplitude so that with an aperture 61 of about 2.33X, the profile shown in FIG. 8 just barely indicates the positions of these 1-wide elements. The profile of FIG. 8 is undecodable using standard decoding circuitry, and FIGS. 6 and 7 are likely undecodable using such circuits. The wide elements, e.g., the 2-, 3- and 4-wide bars 64, 66 and 68, and the 2- and 3-wide spaces 70 and 71, are still discernible and have significant contrast therebetween (e.g., valleys 74, 76 and 78, and peaks 80 and 81 in the profile of FIG. 8, all respectively). Importantly, the positions of all valleys and peaks for the 2-, 3- and 4-wide bars and spaces effectively remain constant as the aperture 61 in the sensor 54 increases, as shown by comparing FIG. 3 to FIG. 9. In FIG. 10, however, as the aperture 61 increases to 3.0X, the amplitudes of, and thus the contrast between, the valley 74 and the peak 80 for the 2-wide bar 62 and space 70, respectively, tend to diminish as these 2-wide elements also become unresolved.

As is known, when the size of an aperture 61 increases, the depth-of-field decreases, so that if the size of an aperture doubles, the depth-of-field is reduced in half. The profiles shown in FIGS. 3 through 10, therefore, can also be used to demonstrate the profiles that would be produced by the sensor 54 having a fixed aperture 61 of 0.8X, but where the profiles are generated by the reader 50, from about an in-focus distance of about 0.5 inches (FIG. 3) to a significantly out-of-focus distance of approximately 1.5 inches (FIG. 10) for the symbol 53. Additionally, the profiles shown in FIGS. 3–10 may also be used to demonstrate an out-of-focus laser scanner or wand, or a CCD-type reader having too few pixels in its CCD array to adequately resolve a given image.

Figure 11A:
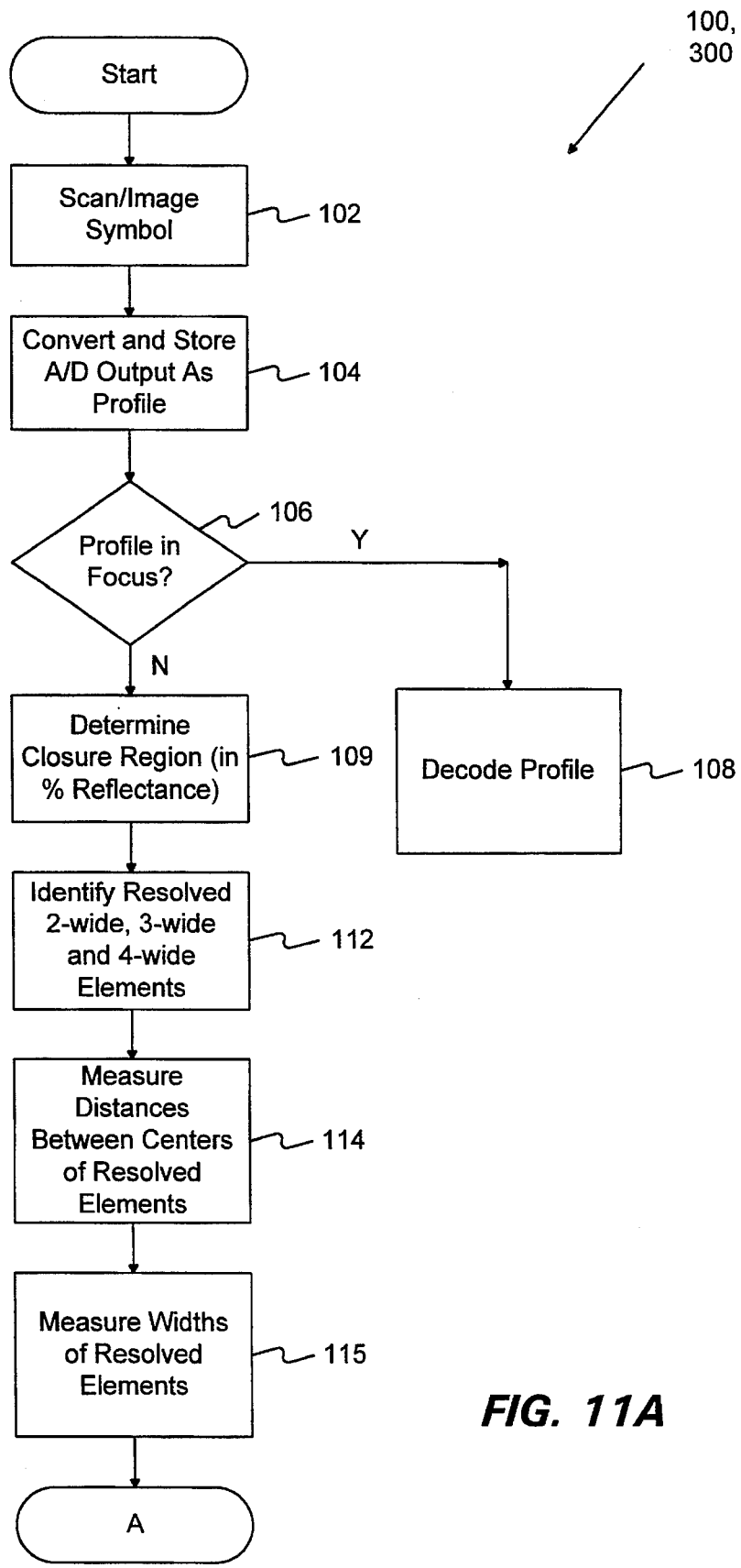
FIGS. 11A and 11B are flowcharts which together show a method of decoding unresolved profiles produced by the reader of FIG. 1.

Referring now to FIGS. 11A and 11 B, a routine 100 for decoding the unresolved profile shown in FIG. 2B utilizing the present invention begins in step 102 (FIG. 11A) by scanning or imaging the symbol 53 to produce a profile. The routine 100, and all routines and methods described herein, are generally performed by the processor 60 and are permanently stored within the memory 57. In step 102, the processor 60 signals the light source 52 to provide light to the symbol 53. The sensor 54 receives the modulated light reflected from the symbol 53 and produces an analog signal profile. In step 104, the converter 56 converts the analog signal to a multi-level digital signal profile which is then input to the processor 60. In step 106, the processor 60 determines if the profile is in-focus, i.e., all elements in the symbol 53 are resolved, and if so, in step 108, the processor decodes the profile.

If the profile exhibits closure, i.e., some elements in the symbol 53 are unresolved, then in step 109, the processor 60 analyzes the profile to identify the higher peaks and lower valleys in the profile by determining a closure boundary. The unresolved 1-wide elements in the symbol 53 are represented, if at all, by ripples in the middle of the profile of FIG. 2B, all within a "gray zone" or closure region 110 of FIG. 2B. Peaks or valley outside of the closure region 110 correspond to resolved elements in the symbol 53, while any information in the profile within the closure region 110 is unreliable (i.e., undetectable or indistinguishable from noise or priming errors). Under the routine 100, the processor 60 must begin to decode a closure profile by determining which elements are resolved in the profile. Therefore, in step 109, the processor 60 examines the profile of FIG. 2B to determine how often the profile reaches or crosses each of a series of reflectance thresholds between of 0% and 100% reflectance.

In step 109, the processor 60 repeatedly examines the profile by first determining how often the profile crosses an initial preselected percent reflectance threshold of 0%. The processor 60 then increases the percent reflectance threshold by 1% and determines how often the profile crosses this threshold. Thereafter, the processor 60 again increases the threshold by 1% (to 2%), determines how often the profile crosses the new percent reflectance threshold, and continues in this manner up to 100% reflectance. The profile is retained in the memory 57 as a string of reflectance level values, and therefore, it may be analyzed repeatedly. To illustrate the process schematically, the processor 60, under the routine 100, in essence draws equally spaced horizontal lines across the profile in FIG. 2B, for example, at 1% reflectance intervals, and then determines how often the profile crosses a given reflectance threshold. FIG. 2B shows reflectance thresholds at 10, 20, 30, 40, 50, 60 and 70% as horizontal dashed lines.

As noted above, U.P.C.-A symbols always include a total of 59 elements which produce 60 transitions in a fully resolved profile. For example, FIG. 3 shows a fully-resolved profile. Under step 109, the processor 60 analyzes the profile of FIG. 3 and determines that the profile crosses reflectance thresholds a total of 60 times for thresholds of about 15% to about 85%. Consequently, the profile of FIG. 3 has a "crossing count" of 60 between reflectance thresholds of about 15% and 85%, represented by the single flat region in the plot of FIG. 12 which illustrates crossing count versus percent reflectance. The profile of FIG. 3 produces the flat crossing count plot between about 15% and 85% reflectance because all of the valleys in the profile have approximately the same amplitude, and thus have the same reflectance, while all of the peaks have approximately the same amplitude or reflectance.

Figure 13:
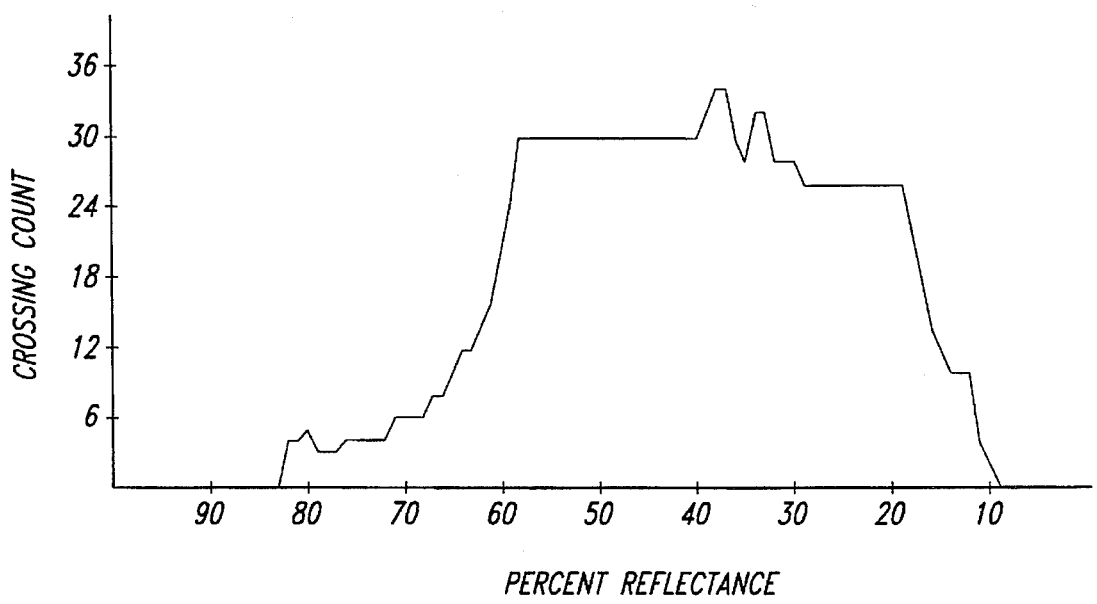
FIG. 13 is a plot showing the number of times the profile of FIG. 2B exceeds a reflectance value of between 0 and 100%.

The profile of FIG. 2B, however, fails to resolve the 1-wide elements in the symbol 53. Consequently, as shown in FIG. 13, the profile of FIG. 2B more erratically crosses various reflectance thresholds. The plot in FIG. 13 shows two flat areas where the crossing count remains constant for several continuous reflectance thresholds: between approximately 20% and 30% reflectance and between approximately 42% and 60% reflectance. The flat area between the 42% and 60% reflectance thresholds, or "higher reflectance region," in the plot of FIG. 13 represents a crossing count of 30, corresponding to resolved spaces in the profile. Similarly, the flat area between 20% and 30% reflectance thresholds, or "lower reflectance region," represents a crossing count of 26, corresponding to resolved bars in the profile. The plot in FIG. 13 also shows a jumbled region between about 30% and 42% reflectance corresponding to the closure region 110. The region between 30% and 42% reflectance in the plot of FIG. 13 corresponds to the 1-wide spaces that lack sufficient reflectivity, 1-wide bars that have too much reflectivity, and "blurring" with other adjacent 1-wide elements, so that these narrow elements are indistinguishable from the neighboring peaks and valleys produced by the wider spaces and bars.

The processor 60, in step 109, analyzes the profile of FIG. 2B and effectively creates, and stores in the memory 57, data representative of a crossing count plot as shown in FIG. 13. Once created, the processor 60 examines the crossing count plot to locate the upper and lower reflectance regions in the plot so as to establish upper and lower closure thresholds or boundaries. The processor 60 establishes an upper closure boundary as a reflectance threshold within the upper reflectance region, which for the profile of FIG. 2B, is a reflectance threshold of between 42% and 60% reflectance. Similarly, the processor 60 establishes a lower closure boundary as a reflectance threshold within the lower reflectance region, which for the profile of FIG. 2B, is a reflectance threshold of between 20% and 30% reflectance.

As explained below, the processor 60 determines which elements in the symbol 53 are resolved by identifying those peaks which extend above the upper closure boundary to be resolved spaces and those valleys that extend below the lower closure boundary to be resolved bars. Restating, the upper and lower closure boundaries help the processor 60 determine which portions of, or data in, the profile are reliable and which portions should be ignored.

The actual reflectance thresholds established as the upper and lower closure boundaries are preferably close to the closure region 110, which for the profile of FIG. 2B, would be about a 42% reflectance value for the upper closure boundary and about a 30% reflectance value for the lower closure boundary. The upper and lower closure boundaries are preferably established close to the closure region 110 because measurements of the profile are taken at these boundaries, as is discussed more fully below, and such measurements are generally more accurate when taken close to the closure region. Selecting upper and lower closure boundaries too close to the closure region 110, however, could produce erroneous measurements due to noise or other errors in the profile. Therefore, the processor 60 preferably selects the upper and lower closure boundaries to be a fixed percent reflectance (e.g., 2%) from the closure region 110, and as shown in FIG. 2B, the processor selects an upper closure threshold or boundary 111 to be at approximately 44% reflectance and a lower closure threshold or boundary 111' to be at approximately 28% reflectance.

For the profile shown in FIG. 9, the processor 60 in step 109 preferably establishes an upper closure boundary 111 at about a 46% reflectance value and a lower closure boundary 111' at about a 28% reflectance value. As shown in FIG. 9, the peak in the profile immediately to the left of the valley 76 just exceeds the lower closure boundary 111'. In FIG. 10, this same peak is positioned even closer to the lower closure boundary 111', which the processor 60 preferably establishes at about a 25% reflectance value. The valley 74 just drops below the lower closure boundary 111' in the profile of FIG. 10. As a result, the profile of FIG. 10 represents a maximum aperture 61 opening at which constant or linear upper and lower closure boundaries 111 and 111' can be established by the processor 60 for identifying the resolved wide bars and spaces in the profile.

Figure 14:
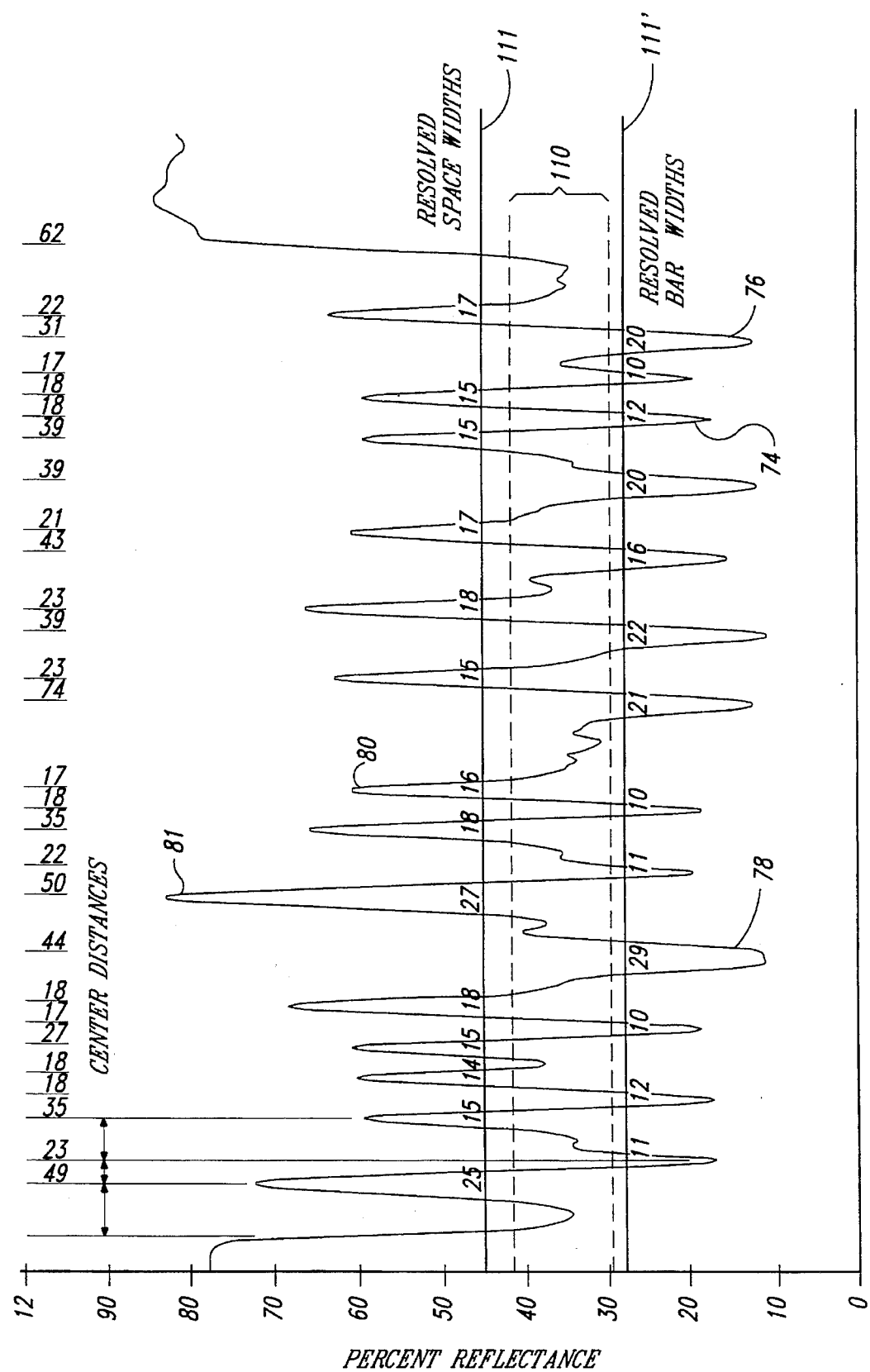
FIG. 14 shows the profile of FIG. 2B with the distances between the centers of peaks and valleys in the profile, and the widths of the peaks and valleys, indicated with respect to the profile.

In step 112, the processor 60 extracts or filters out the reliable information from the profile by identifying the resolved 2-, 3- and 4-wide spaces and bars as the peaks and valleys in the profile that extend beyond the upper and lower closure boundaries 111 and 111', respectively. In step 114, the processor 60 locates the centers of the resolved peaks and valleys identified in step 112, and then measures and stores the distances between the centers. FIG. 14 shows the distances, in arbitrary units, between the centers of the resolved elements from the profile of FIG. 2B. For the routine 100, the units used are a multiple of the quantization used by the processor 60. Alternatively, the units can be a multiple of a rate of a clock coupled to the processor, or the units can be related to the resolution of the sensor 54.

The processor 60 locates the center of each peak and valley in the profile by first locating the two points at which a given peak or valley crosses the upper or lower closure boundary 111 and 111', respectively, and then locating a center point along that boundary which is halfway between the two points. The processor 60 determines the distances between the centers of identified peaks and valleys, or "center distances," based on the positions of the identified peaks and valleys with respect to an imaginary axis normal to the peaks and valleys (e.g., a line of Y=100% reflectance for the profile of FIG. 14). Alternatively, the processor 60 can locate the centers of each peak and valley in the profile by determining the position of the highest or lowest point for a given peak or valley, respectively. Determining the position of the highest/lowest point can be performed using known methods, such as locating the points at which the slope of the profile changes sign (e.g., from positive to negative), or when the amplitude changes from an increasing value to a decreasing value, or vice versa. With any method, the processor 60 can locate the centers of the resolved elements in the profile despite the presence of printing defects in the symbol 53 such as spots or voids, heavy or light ink spread, low contrast, or other noise, and is thus immune to poor print quality.

In step 115, the processor 60 measures and stores the widths of the resolved elements in the profile. FIG. 14 shows the widths of the resolved spaces at the upper closure boundary 111, and the widths of the resolved bars at the lower closure boundary 111', both in the arbitrary units. The element widths measured in step 115 generally cannot be used to directly determine the actual widths of the elements in the symbol 53 because the profile is distorted compared to an in-focus profile. The measured element widths, however, are useful in a relative way to determine which elements are 2-, 3- and 4-wide elements. Determining which elements are 2-, 3- and 4-wide elements is helpful in decoding the profile, as explained below. The processor 60 need not measure the widths of the resolved elements at the upper and lower closure boundaries 111 and 111', however, since the processor previously established such boundaries, the boundaries provide a known and efficient location at which to measure the widths of all resolved elements.

After measuring the distances between the resolved elements and the widths of these elements in the profile, all reliable data has been extracted from the profile. Therefore, the processor 60 no longer needs the stored digital profile and the portion of memory which stored this profile can be used for other purposes, such as storing a profile from the next symbol read by the reader 50.

Figure 11B:
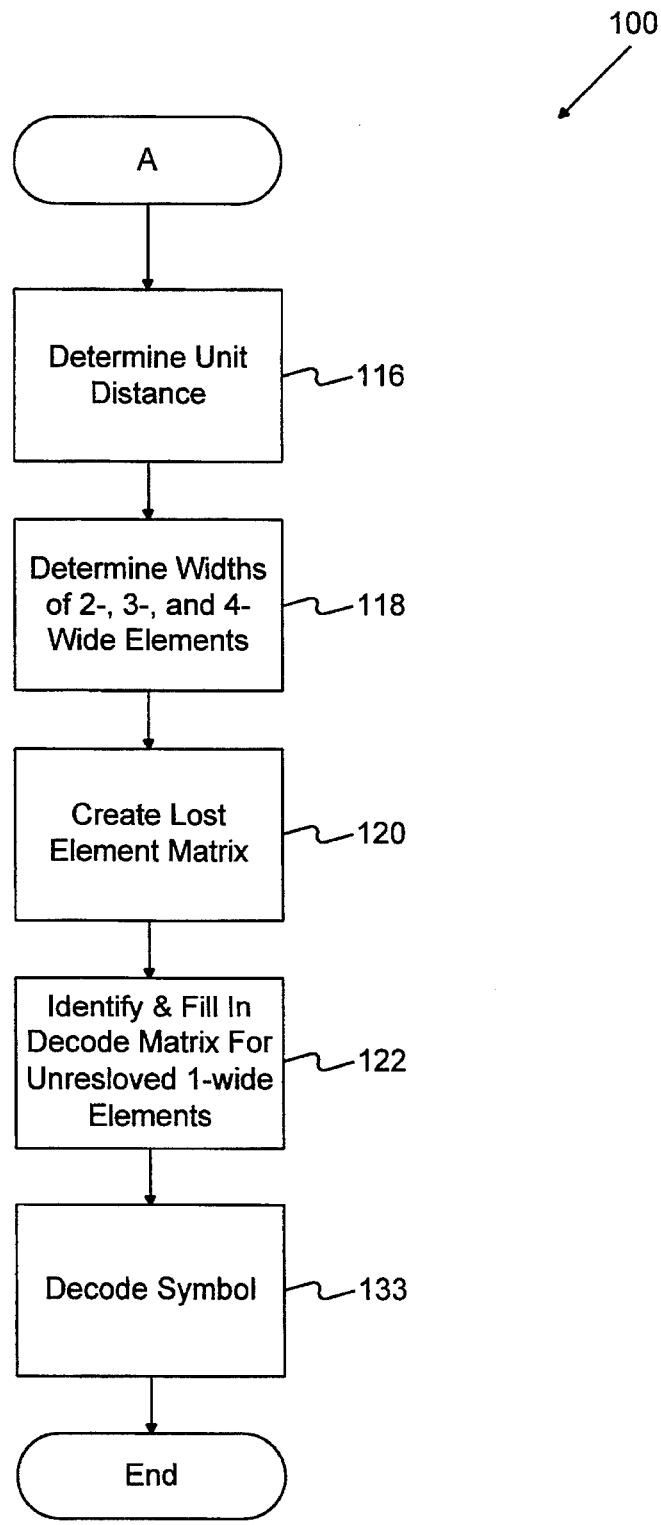

In step 116 of FIG. 11B, the processor 60 determines a width, or "unit distance," in the arbitrary units, of the 1-wide elements based on the smallest center distance values measured from the profile. The smallest center distance generally corresponds to a 2-wide bar next to a 2-wide space, and is referred to herein as the "STD." The distance between the center of a valley defining the 2-wide bar and the center of the peak defining the 2-wide space will necessarily include two elements (i.e., one-half of a 2-wide bar and one-half of a 2-wide space, or 1 element+1 element=2 elements). Therefore, dividing the STD by two provides the unit distance.

In the profile of FIG. 14, the STD is 17. Consequently, dividing this STD by 2 provides a unit distance of 8.5. To obtain a more accurate unit distance, the processor 60 preferably averages the smallest center distances (having values of 17 and 18 in FIG. 14) to produce a unit distance of 8.8. To simplify the following discussion, an STD of 18 and a unit distance of 9 are adopted; however, the routine 100 preferably does not round off to such an extent these and other measurements discussed herein.

In step 118, the processor 60 determines an estimated width of the resolved elements for 2-wide, 3-wide and 4-wide elements. Because of printing defects, the resolved spaces are often wider than the resolved bars, or vice versa. Therefore, the measured widths of the resolved bars are often unequal to the measured widths of the resolved spaces in a profile for a given element width (e.g., a measured width of a 2-wide space is often unequal to the measured width of a 2-wide bar). Additionally, since the widths of the resolved spaces are measured at the upper closure boundary 111 and the widths of the resolved bars are measured at the lower closure boundary 111', the measured widths vary depending upon where the upper and lower closure boundaries are selected with respect to the profile. As a result, the unit distance generally cannot be used to accurately determine the width of all resolved elements.

Therefore, the processor 60 in step 120 averages the measured widths of the first few smallest resolved spaces at the upper closure boundary 111 to determine an average estimated width of the 2-wide spaces in the profile. Similarly, the processor 60 in step 120 averages the measured widths of the first few smallest resolved bars at the lower closure boundary 111' to determine an average estimated width of the resolved 2-wide bars. Averaging the first four smallest measured widths for resolved spaces and bars in the profile of FIG. 14, the processor 60 produces an estimated width for the resolved 2-wide spaces of 15.5 and for the resolved 2-wide bars of 11. The widths of the larger resolved elements are determined by adding the unit distance to the average estimated 2-wide distance since the 2-wide distance determined separately for the smallest resolved bars and spaces includes the differences between the bars and spaces in a given symbol based on printing defects and so forth. Table 1, below, shows an example of the estimated widths for the 2-, 3- and 4-wide resolved elements as estimated based simply on the unit distance, and as adjusted based on an average of the first four 2-wide bars and spaces in the profile of FIG. 14. As used generally herein, the "estimated width" corresponds to the entries under the Estimated Width of Resolved Elements from Averaged Widths column in Table 1 below.

TABLE 1

ESTIMATED RESOLVED ELEMENT WIDTHS

| Resolved Element | Estimated Width of Resolved Element from Unit Distance | Estimated Width of Resolved Element from Averaged Widths |
|---|---|---|
| 2-wide | 2 × (unit distance of 9) = 18 | space: 15.5<br>bar: 11 |
| 3-wide | 3 × (unit distance of 9) = 27 | space: 15.5 + 9 = 24.5<br>bar: 11 + 9 = 20 |
| 4-wide | 4 × (unit distance of 9) = 36 | space: 15.5 + 18 = 33.5<br>bar: 11 + 18 = 29 |

In step 120, the processor 60 creates a table, array or "lost element matrix" that is a key to decoding the closure profile of FIG. 2B. The lost element matrix estimates the various distances between resolved element pairs, and therefrom determines the number of 1-wide elements unresolved or "lost" between the resolved elements. The lost element matrix can be created because of the following three properties common in all fixed multi-width symbologies such as U.P.C. and Code 93: (1) if a resolved space immediately follows a resolved bar, then zero 1-wide elements are lost therebetween; (2) if a resolved bar follows a resolved space or vice versa, then only an even number of 1-wide elements are present therebetween; and (3) if two like resolved elements (e.g., two 3-wide bars) are adjacent in a given profile, then only an odd number of 1-wide elements are present therebetween. As used generally herein, "opposite resolved elements" refers to a 2-, 3- or 4-wide bar and a 2-, 3- or 4-wide space next to each other in a given profile, while "adjacent resolved elements" refers to two 2-, 3- or 4-wide bars or two 2-, 3- or 4-wide spaces next to each other in the profile. The terms "opposite" and "adjacent" refer to an element's "parity" or the element's location in the reflectance profile so that "adjacent elements" each have similar reflectance values while "opposite elements" each have very different reflectance values. Elements having opposite parity always have an even number of 1-wide elements lost therebetween while elements having adjacent parity always have an odd number of 1-wide elements lost therebetween.

For the U.P.C.-A symbology, the distances between the centers of resolved elements in closure profiles are based on five possible arrangements for resolved element pairs: a 2-wide element next to a 2-wide element (referred to herein as a "2-2" situation or distance), a 2-wide element next to a 3-wide element (a "2-3" situation), a 2-wide element next to a 4-wide element (a "2-4" situation), a 3-wide element next to a 4-wide element (a "3-4" situation), and a 4-wide element next to a 4-wide element (a "4-4" situation). Each element pair situation can have from zero to ten 1-wide elements lost therebetween. A 3-wide element next to a 3-wide element (a "3-3" situation) has the same center distance as the 2-4 distance (and the same number of total elements) for a given number of unresolved elements therebetween. Therefore, the 3-3 and 2-4 distances can contain the same number of 1-wide elements lost depending upon the given distance therebetween.

Similarly, for symbologies that have 5-wide elements, a 5-wide element immediately next to a 2-wide element (a "2-5" situation) has the same center distance as the shortest 3-4 distance. An example of a template for a lost element matrix, which can be used and completed as described below for all multi-width symbologies, is shown in Table 2 below.

TABLE 2

LOST ELEMENT MATRIX

| Number of Lost Elements | Lost Element Parity | Estimated Distance Between Centers of Resolved Element Pairs | | | | |
|---|---|---|---|---|---|---|
| | | 2-2 | 2-3 | 2-4<br>3-3 | 2-5<br>3-4 | 2-6<br>3-5<br>4-4 ... |
| 0 | (Opposite) | | | | | |
| 1 | (Adjacent) | | | | | |
| 2 | (Opposite) | | | | | |
| 3 | (Adjacent) | | | | | |
| . | . | | | | | |
| . | . | | | | | |
| . | . | | | | | |

Since the centers of resolved element pairs must be separated by zero or a discrete number of 1-wide elements, the processor 60, in step 120, can fill in the lost element matrix using the unit distance and the STD. The smallest distance between two opposite 2-wide elements is equal to the average shortest distance for the profile or STD, which corresponds to a 2-wide bar immediately next to a 2-wide space with no 1-wide elements therebetween. The next largest distance in the 2-2 situation corresponds to one 1-wide element lost therebetween. Therefore, the next entry in the 2-2 column corresponds to the STD plus the unit distance. The next largest distance in the 2-2 situation corresponds to two 1-wide lost elements or STD +(2× unit distance). For the 2-3 situation, the smallest distance between a 2-wide element immediately next to a 3-wide element corresponds to the STD plus one-half the unit distance. The next largest distance for the 2-3 situation corresponds to the STD+(1.5× the unit distance), and so forth.

Table 3 below shows the lost element matrix that includes the equations for determining the estimated center distance for resolved element pairs in U.P.C.-A symbols. Table 3 is a subset of Table 2, designed specifically for the U.P.C. symbology.

TABLE 3

U.P.C.-A LOST ELEMENT MATRIX

| Number of Lost Elements | Lost Element Parity | Estimated Distance Between Centers of Resolved Element Pairs | | | | |
|---|---|---|---|---|---|---|
| | | 2-2 | 2-3 | 2-4 3-3 | 3-4 | 4-4 |
| 0 | (Opposite) | STD + | STD + (0.5 × unit distance) | STD + unit distance) | STD + (1.5 × unit distance) | STD + (2 × unit distance) |
| 1 | (Adjacent) | STD + unit distance | STD + (1.5 × unit distance) | STD + (2 × unit distance) | STD + (2.5 × unit distance) | STD + (3 × unit distance) |
| 2 | (Opposite) | STD + (2 × unit distance) | STD+ (2.5 × unit distance) | STD+ (3 × unit distance) | STD+ (3.5 × unit distance) | STD+ (4 × unit distance) |
| 3 | (Adjacent) | STD + (3 × unit distance) | STD + (3.5 × unit distance) | STD + (4 × unit distance) | STD + (4.5 × unit distance) | STD + (5 × unit distance) |
| . | . | . | . | . | . | . |
| . | . | . | . | . | . | . |

Based on the equations of Table 3, the processor 60, in step 120, fills in the lost element matrix with estimated center distances between resolved elements using the unit distance of 9 and the STD of 18. Therefore, the smallest 2-2 distance corresponds to the STD or 18 as shown in the 2-2 column of Table 4. The next largest distance in the 2-2 column must include the width of one 1-wide element, and corresponds to the STD plus the unit distance or 18+9=27. The next largest distance must include the width of two 1-wide elements or 36, and so forth for all entries in the 2-2 column of Table 4.

The smallest 2-3 center distance corresponds to the STD of 18 plus one-half the unit distance or 22.5. while the next largest distance must include the width of a single 1-wide element (i.e., 22.5 plus the unit distance, or 31.5), and so forth for the 2-3 column in Table 4. The STD plus the unit distance provides the smallest distance between 3-3 and 2-4 resolved element pairs (i.e., 27). As shown below in Table 4, the processor 60 continues to fill in the lost element matrix in a similar fashion for 3-4 and 4-4 element pairs as it solves the equations in Table 3 for the calculated STD and unit distance.

TABLE 4

EXEMPLARY U.P.C.-A LOST ELEMENT MATRIX

| Number of Lost Elements | Lost Element Parity | Estimated Distance Between Centers of Resolved Element Pairs | | | | |
|---|---|---|---|---|---|---|
| | | 2-2 | 2-3 | 2-4 3-3 | 3-4 | 4-4 |
| 0 | (Opposite) | 18 | 22.5 | 27 | 31.5 | 36 |
| 1 | (Adjacent) | 27 | 31.5 | 36 | 40.5 | 45 |
| 2 | (Opposite) | 36 | 40.5 | 45 | 49.5 | 54 |
| 3 | (Adjacent) | 45 | 49.5 | 54 | 58.5 | 63 |
| 4 | (Opposite) | 54 | 58.5 | 63 | 67.5 | 72 |
| 5 | (Adjacent) | 63 | 67.5 | 72 | 76.5 | 81 |
| 6 | (Opposite) | 72 | 76.5 | 81 | 85.5 | 90 |
| 7 | (Adjacent) | 81 | 85.5 | 90 | 94.5 | 99 |

After filling in the lost element matrix (Table 4) in step 120, the processor 60, in step 122, compares each center distance as measured in step 114 to the entries in the matrix to find the closest estimated distance in the matrix. Based on the closest estimated distance in the matrix, the processor 60 determines the number of 1-wide elements lost between two resolved wider elements from the left hand column of the matrix. Rather than simply matching a given measured center distance to all distances in the matrix, the processor 60 in step 122 first compares the measured widths of the resolved elements bordering or defining the center distance therebetween to the estimated widths in Table 1, to thereby estimate the widths of the elements defining the measured center distance. Based on the widths of resolved elements, the processor 60 selects the appropriate column in the matrix. As a check, the processor 60 in step 122 determines whether the resolved elements are opposite or adjacent to ensure that the correct row in the matrix is selected based on the parity of the resolved elements.

In step 122, the processor 60 also constructs a decode table, array or matrix, an example of which is shown in FIG. 15. The decode matrix of FIG. 15 shows, in row 124, all of the measured center distances between resolved element pairs taken from the profile of FIG. 14. Row 126, below and offset from row 124, shows all of the measured widths of the resolved elements taken from the profile of FIG. 14 which border the measured centers distances in row 124.

Row 128 contains the size of the resolved elements. Processor 60 fills in row 128 by comparing the measured widths in row 126 to the estimated widths in Table 1, as mentioned above. For example, if the processor 60 determines that a space has a measured width in row 126 of 14, the processor compares this width to Table 1 and determines that the measured width of 14 corresponds most closely to the estimated width of 15.5 for a 2-wide space. Therefore, the processor 60 fills in row 128 with a corresponding "2" below the value "14" in row 126. While the processor 60 can compare each measured width in row 126 to Table 1 and fill in row 128 in its entirety before proceeding with any further processing of the profile, the processor 60 preferably fills in row 128 as it serially analyzes each center distance in row 124 from left to right.

In rows 126 and 128, a positive value indicates a space or peak in the profile (high reflectance), while a negative value indicates a bar or valley (low reflectance). For example, the values of "25" and "−11" in row 126 refer to the measured widths of a resolved space and bar, respectively, while the values of "3" and "−2" in row 128 refer to a 3-wide space and 2-wide bar, respectively.

The processor 60 is step 122 begins by comparing the left-most measured center distance in row 124 to determine the number of lost elements within that distance, and then continues rightward along row 124, although the processor 60 need not analyze the measured centers distances from left to right in row 124, but for example, can start in the middle of the string of measured center distances in this row. The first center distance in row 124 is 49, which is bordered by a space to the right having a measured width of 25, as shown in row 126, and the quiet zone to the left of the symbol 53. The quiet zone is a clear space, containing no dark marks, that precedes or follows a symbol. The processor 60 compares the measured width of 25 to Table 1, and determines that the closest estimated width is 24.5 for a 3-wide space.

The processor 60, having first determined the widths of the two resolved elements bordering the measured center distance, then compares the measured center distance to the estimated center distances provided in Table 4, under the appropriate column. For purposes of discussion herein, the quiet zone is assumed to be at least a 2-wide space. Therefore, in this example, the 2-wide space next to a 3-wide space would correspond to the "2-3" column in Table 4, and the measured center distance of 49 corresponds closely to the estimated distance of 49.5 in the table. Based on the estimated center distance of 49.5 in Table 4, the processor 60 determines that three 1-wide elements are lost between the quiet zone and the 3-wide space. The processor 60 knows that three 1-wide elements are lost between the quiet zone and the 3-wide space, rather than a single 3-wide element or a 2-wide with a 1-wide element lost therebetween, because all of the 2-, 3- and 4-wide elements are resolved; only the 1-wide elements are lost.

As a check, the processor 60 compares the parity of the resolved elements bordering the measured center distance to the lost element parity column in Table 4. The processor 60 knows that the resolved elements bordering the measured center distance are two spaces (the 2-wide quiet zone next to a 3-wide space), and therefore that the elements are considered adjacent. The processor 60 recognizes from Table 4 that the parity for three lost elements requires adjacent resolved elements, and thus, the parity matches, confirming that three 1-wide elements are lost within the measured center distance of 49. The processor 60 therefore begins to fill in row 130, which indicates the number of unresolved 1-wide elements lost between resolved elements, with a left-handmost value of "3," beneath the measured center distance of 49 in row 124 above. The processor 60, having confirmed that the measured width of 25 corresponds to a 3-wide space, also fills in row 128 with a "3" beneath the value "25" in row 126 above.

Since the parity must match for a given entry in Table 4, the method under the present invention is considerably tolerant of errors in any estimated center distances, estimated widths, and so forth. The estimated or measured distances can be off by as much as several whole integer units in either direction before the method under the present invention produces an error. For example, comparing the measured center distance of 49, the next possible center distances in the 2-3 column in Table 4, with the appropriate parity, is 67.5 or 31.5, both much less similar to the measured distance of 49 than the estimated center distance of 49.5. In fact, under the present invention, a measured centers distance may be off by the width of a whole 1-wide element (i.e., a whole X dimension) and still be properly decoded.

Under the preferred method, as demonstrated above, the processor 60 in step 122 establishes the width of the resolved element to the left of the current measured center distance from the analysis of the previous measured center distance, and estimates the width of the element to the right of the center distance. After determining the number of lost elements within the current measured center distance and checking the parity, the processor 60 confirms that the estimated width of the resolved element to the right of the measured center distance was correct. This confirmed element width is then added to row 128 and used in selecting the appropriate column in Table 4 for determining the number of lost 1-wide elements within the next measured center distance. If the width of the new right-hand resolved element does not correlate closely to the estimated width in Table 1, the processor 60 compares the measured center distance to all of the entries in the columns of Table 4 to find the closest estimated center distance that corresponds to the appropriate parity, as shown by way of example below.

The next center distance in row 124 is 23, which is bordered by the previous 3-wide space (in row 128) and a bar having a measured width of 11 (in row 126). The 11 wide bar, under Table 1, correlates exactly to the estimated width for a 2-wide bar. Under the 2-3 column of Table 4, the measured center distance of 23 most closely correlates to the estimated center distance of 22.5. Table 4 shows that the estimated center distance of 22.5 between 2-wide and 3-wide elements corresponds to zero lost elements within the center distance. Zero lost elements corresponds to an opposite parity and the 2- and 3-wide elements are opposite elements (a bar next to a space), therefore the parity matches. Consequently, the processor 60 confirms that the 3-wide space is contiguous with a 2-wide bar in the symbol 53 and that no 1-wide elements are lost therebetween. The processor 60 stores or enters a "–2" in row 128, beneath the measured width of 11 in row 126, and a "0" in row 130, following the 3 previously stored in this row.

The next measured center distance in FIG. 15 is 35, which is between the 2-wide bar (row 128) and a space having a measured width of 15 (row 126). The 15 wide space, under Table 1, corresponds closely to the estimated width of 15.5 for a 2-wide space. Under column 2-2 of Table 4, the measured center distance most closely correlates to the estimated center distance of 36, and thus two 1-wide elements are lost therein. Two lost elements correspond to an opposite parity, and the 2-wide bar next to the 2-wide space correspond to opposite elements, thus the parity matches. Consequently, the processor 60 enters a 2 to rows 128 and 130, and continues to fill in row 130, as the processor compares the measured widths in row 126 and the measured center distances in row 124 to the estimated widths and center distances in Tables 1 and 4, respectively, and determines the number of lost 1-wide elements therebetween.

For the profile of FIG. 14, a few calculations are noteworthy. Row 124 shows a measured center distance of 18, which is between a bar having a measured width of 10 and a space having a measured width of 18 (from row 126). The bar was previously established as a 2-wide bar and entered into row 128 during analysis of the previous measured center distance. The 18 wide space, under Table 1, most closely correlates to the estimated width of 15.5 for a 2-wide space. Under the 2-2 column in Table 4, the measured center distance of 18 correlates exactly with the estimated center distance at 18, and thus zero 1-wide elements are lost therein. Zero lost elements corresponds to an opposite parity, and the 2-wide bar and the 2-wide space correspond to opposite elements, thus the parity matches.

Assume for example, however, that the processor 60 incorrectly estimated the 18 wide space to be a 3-wide space, and consequently determined that the measured center distance of 18 was between the 2-wide bar and a 3-wide space. Under column 2-3 in Table 4, the measured center distance of 18 most closely correlates to the estimated center distance having a correct parity of 22.5. The distance of 22.5 is 4.5 units from the measured distance of 18. The processor 60 recognizes that the difference of 4.5 is significant as compared to previous correlations between measured and estimated distances. Therefore, the processor 60 compares the measured center distance of 18 to all the estimated center distances in Table 4 having the correct parity. The estimated center distance of 18 in the 2-2 column correlates exactly to the measured distance of 18, representing a difference of zero units. Therefore, since the measured center distance correlates exactly with the estimated center distance, and the 2-wide bar was previously established, the space must be a 2-wide space instead of a 3-wide space. Consequently, the processor 60 enters a "2" in row 128 corresponding to the measured width of 18 and a "0" in row 130 corresponding to the measured center distance of 18.

The next measured center distance in row 124 is 44, which is between the previous 2-wide space (row 128) and a bar having a measured width of 29 (row 126). The 29 wide bar, under Table 1, corresponds exactly to the estimated width for a 4-wide bar. Under the 2-4 column in Table 4, the measured center distance of 44 correlates most closely with the estimated center distance of 45, and thus two 1-wide elements are lost therein. Two lost elements corresponds to an opposite parity, and the 2-wide space next to the 4-wide bar corresponds to opposite elements, and thus the parity matches. Consequently, the processor 60 enters a "–4" in row 128 and a "2" in row 130.

The following measured center distance in row 124 is 50, which is between the previous 4-wide bar and a space having a measured width of 27. The 27 wide space, under Table 1, correlates more closely to the estimated width for a 3-wide space (i.e., 24.5, for a difference of 2.5), rather than to the estimated width for a 4-wide space (i.e., 33.5, for a difference of 6.5). Therefore, the processor 60 initially selects the 3-4 column of Table 4, and the measured center distance of 50 corresponds almost exactly with the estimated center distance of 49.5, and thus two 1-wide elements are lost therein. Two lost elements corresponds to an opposite parity, and the 4-wide bar and the 3-wide space are opposite elements, and thus the parity matches. Since the parity matches and the estimated center distance differs from the measured center distance by only 0.5, the processor 60 confirms that the 27 wide space is a 3-wide space and that two 1-wide elements are lost within the measured center distance. Consequently, the processor 60 enters a "3" in row 128 and a "2" in row 130.

Ignoring several subsequent distances, the next measured center distance of interest in row 124 is 74, which is between a space having a measured width of 16 and a bar having a measured width of 21. Referring to Table 1, the space correlates most closely to the estimated width of 15.5 for a 2-wide space, while the bar correlates most closely to the estimated width of 20 for a 3-wide bar. Comparing the measured center distance of 74 to the estimated center distances in Table 4, and assuming that only the 2-wide space has been correctly identified based on the analysis of the previous measured center distance, the processor 60 determines that the closest estimated center distances having the correct parity are 72 (under the 2-2 column) and 76.5 (under the 2-3 column). Either possibility yields six lost elements. The next closest values of 72 and 76.5 in Table 4 (under the 2-4 and 3-4 columns, respectively) correspond to adjacent elements, and thus do not have the correct parity. Therefore, since the 16 wide space correlates most closely to the estimated width for a 2-wide space, and since the measured center distance of 74 most closely correlates to the estimated center distance under the 2-2 column, the processor 60 enters a "2" in row 128 corresponding to the 2-wide space. Also, the processor 60 enters a "6" in row 130 corresponding to six 1-wide elements lost within the measured center distance of 74. The large number of missing 1-wide elements in the center of the profile correspond to the center guard area common in all U.P.C.-A symbols. The center guard area includes at least five 1-wide elements: two 1-wide bars separating three 1-wide spaces.

Row 132 in FIG. 15 shows the resulting string of element widths as the processor 60 fills in the decode matrix for all resolved element widths in row 128 and all unresolved 1-wide elements in row 130. For example, row 130 shows that "3" elements are lost between the quiet zone and the first 3-wide space shown in row 128. Therefore, the processor 60 creates row 132 as a composite of rows 128 and 130, with a "3" below the same entry above in row 128, and three "1s" below the "3" entry in row 130. The positive and negative distinctions between bars and spaces is dropped because they are unnecessary for purposes of decoding any symbols (all of the lost elements have been found and the parity has been checked). Therefore, the first 2-wide bar shown in row 128 as "–2" is instead shown in row 132 as "2."

In step 133 of FIG. 11B, the processor 60 converts the resulting string of element widths in row 132 into a string of elements that are parsed into characters, as shown in row 134 of FIG. 15. The first pattern in row 134, i.e., the initial three "1s," corresponds to the left guard pattern of the U.P.C.-A symbol 53 (two 1-wide bars separated by a 1-wide space). The next six characters consist of four elements each and correspond to a manufacturer's code. The following pattern contains five 1-wide elements and corresponds to the center guard pattern. Six characters of four elements each follow the center guard pattern, five of which correspond to a product code and the sixth corresponding to a check digit. The right guard pattern follows thereafter, a pattern identical to the left guard pattern. The processor 60 readily decodes the elements of row 132 using known methods after they are parsed into characters as in row 134. The string of characters can be checked by consulting a standard U.P.C.-A lookup table and by verifying the check digit using known methods.

Figure 16A:
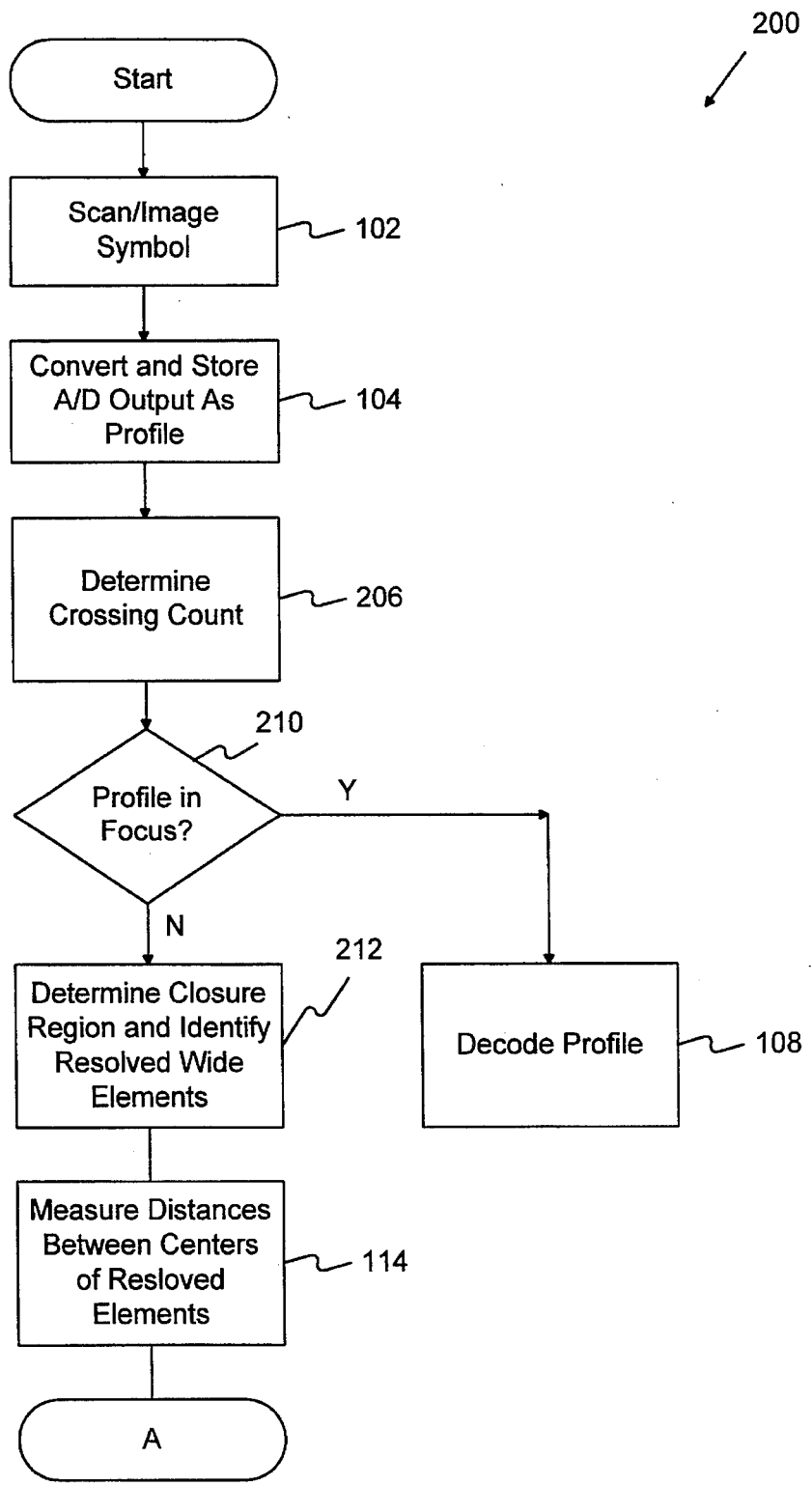
FIGS. 16A and 16B together show a first alternative embodiment to the steps shown in the flowchart of FIGS. 11A and 11B.
Figure 16B:
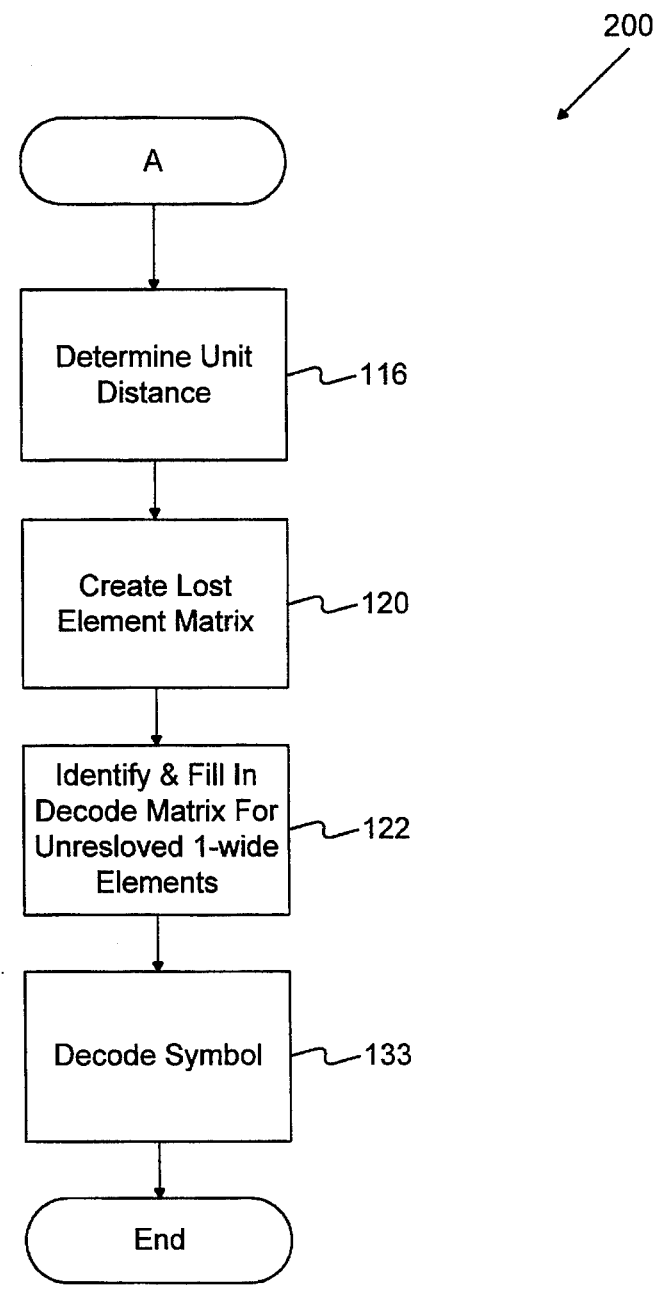

As shown in FIGS. 16A and 16B, a first alternative embodiment under the present invention employs a routine 200 that corresponds closely to the initial steps of the routine 100 shown in FIG. 11A. This alternative embodiment, and those described hereafter, are substantially similar to the previously described embodiment, and common steps are identified by the same reference numbers. Only the differences in operation are described in detail.

As show in FIG. 16A, the routine 200 proceeds through steps 102 and 104 by scanning or imaging the symbol 53 to produce a profile and then converting and storing the profile. In step 206, the processor 60 determines the crossings count for the profile stored in step 104. The processor 60 determines the crossings count as explained above with respect to step 109, and produces a crossings count plot similar to those shown in FIGS. 12 and 13. If the reader 50 is to read many symbols, most of which are out of focus, the routine 200 may more rapidly decode closure profiles by not wasting any processing time on attempting to decode a closure profile, but instead proceeding immediately with steps necessary for decoding a closure profile.

Figure 12:
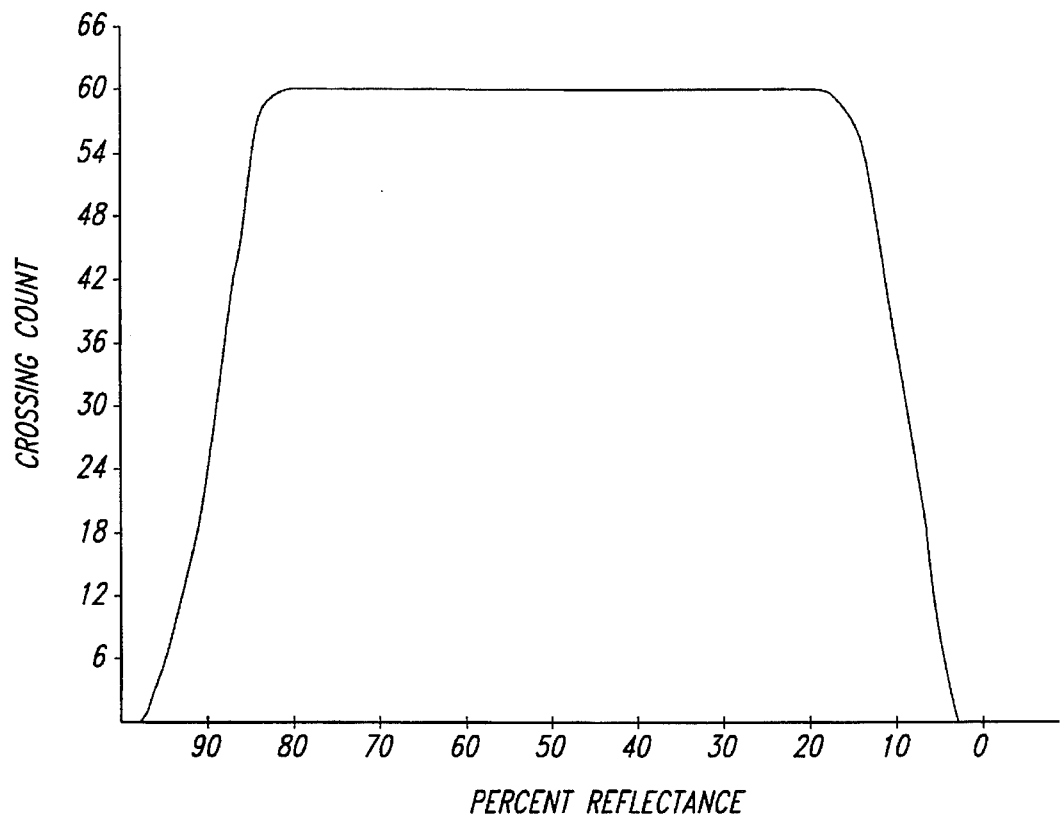
FIG. 12 is a plot showing the number of times the profile of FIG. 3 exceeds a reflectance value of between 0 and 100%.

Determining the crossing count in step 206, however, is not only an initial step in decoding a closure profile, but may also be used to determine if a profile is in-focus (i.e., fully resolved). Therefore, in step 210, the processor 60 examines the crossings count results determined in step 206. If the processor 60 determines that the profile has a crossings count of 60 between about 15% and 85% reflectance, as shown in FIG. 12, the processor determines that the profile is in-focus and the processor proceeds to decode the profile in step 108. Otherwise, in step 212, the processor 60, establishes the upper and lower closure boundaries 111 and 111', and identifies resolved wide elements, as explained above with respect to steps 109 and 112, respectively.

While the processor 60 can determine the upper and lower closure boundaries 111 and 111' based on the crossing count plot and the peaks and valleys, the processor can also establish the boundaries under various alternative methods. For example, the processor 60 can examine the profile itself to establish the upper and lower closure boundaries 111 and 111'. As explained above, the peaks in the profile of FIG. 2B, if resolved, are at the top of the profile to represent spaces in the symbol 53. In the closure profile shown in FIG. 2B, however, the peaks of the 1-wide spaces are quite low in reflectance, and several peaks are found at approximately 35% reflectance (see, e.g., the peak 79 shown more clearly in FIG. 8). The processor 60, in step 214, therefore examines the profile, locates the lowest peak in the profile, and establishes the lower closure boundary 111' as the reflectance of the lowest peak within the profile.

Conversely, the valleys in the profile of FIG. 2B, if resolved, are at the bottom of the profile to represent the bars in the symbol 53. In the closure profiles shown in FIG. 2B, however, the valleys of the 1-wide bars are quite high in reflectance, and several valleys are found at approximately 37% reflectance (see e.g., the valley 72). The processor 60, in step 214, therefore also examines the profile to locate the highest valley in the profile, and establishes the lower upper boundary 111 as the reflectance of the highest valley within the profile. Overall, when the highest valley is above the lowest peak in a profile, excluding element defects such as spots or voids caused during printing of the symbol, the profile is a closure profile and no narrow elements are effectively resolved (compare, e.g., the valley 72 to the peaks to the right of peak 80 in the profile of FIG. 8).

Other alternative methods of determining the upper and lower closure boundaries 111 and 111' include analyzing the profile to determine a mean reflectance threshold and then selecting the upper closure boundary 111 as a fixed percent reflectance increase from the mean, and the lower closure boundary 111' as a fixed decrease from the mean. Having determined the upper and lower closure boundaries 111 and 111', the processor 60 in step 212 identifies resolved elements as those portions of the profile extending above or below the closure boundaries, as explained above with respect to step 112.

In step 212, the processor 60 establishes the upper and lower closure boundaries 111 and 111' to determine which peaks and valleys in the profile correspond to resolved elements. Alternative methods of analyzing the profile to determine which peaks and valleys correspond to resolved elements include analyzing the slopes of the various peaks and valleys in the profile. For example, as the processor 60 analyzes the portion of the profile in FIG. 14 from the peak 81 rightward, the slope of the profile has a great negative slope value as the profile extends from the peak 81 to the next valley. The processor 60 therefore determines that the peak 81 is a resolved space. Additionally, the processor 60 determines from the steep slope that zero 1-wide elements are lost. Alternatively, analyzing the profile from the valley 78 leftward to the peak 81, the slope of the profile has a great positive value until the profile extends into the closure region 110. Within the closure region 110, however, the slope changes value briefly from positive to negative and then back to positive as the profile extends toward the peak 81. The processor 60 recognizes the change in slope within the closure region 110 as a portion within the profile which may contain unresolved 1-wide elements. After analyzing the changing slopes in the profile, the processor 60, using known mathematical techniques, can identify the resolved peaks and valleys in the profile.

In the routine 200, after identifying which elements are resolved, the processor 60, in step 114, measures the distances between the centers of the identified resolved wide elements. Notably, in the routine 200, the processor 60 does not measure the widths of the resolved elements, as was performed in step 115 of the routine 100. Instead, the routine 200 proceeds to steps 116, 120, 122 and 133, shown in FIG. 16B. Under the routine 200, the processor 60 determines the unit distance in step 116 based on the STD. Ignoring step 118, which is performed in the routine 100, the routine 200 in step 120 creates the lost element matrix based on the unit distance and the STD as described above.

In step 122, the processor 60 under the routine 200 only creates rows 124, 130 and 132 in the decode matrix of FIG. 15, as the processor compares each measured center distance to all of the estimated center distances in the lost element matrix, ignoring the column headings (i.e., 2-2, 2-3, etc.). For example, considering the first measured center distance of 49 in row 124, the processor 60 compares this distance to all of the estimated distances in Table 4 and determines that the closest estimated distance is 49.5 (2-3 column) for three lost elements and 49.5 (3-4 column) for two lost elements. The processor 60 examines the profile to the left and right of the measured center distance of 49 and determines that the center distance is bordered by two spaces, i.e., adjacent elements. Therefore, three lost elements must be lost therein because three lost elements corresponds to an adjacent lost element parity, while two lost elements corresponds to an opposite element parity.

Similarly, the next measured center distance of 23 in row 126 most closely correlates to only the estimated center distance of 22.5, and thus, zero elements are lost within the measured distance of 23. The processor 60 enters a "3" and a "0" in row 130 for the measured center distances of 49 and 23, respectively. While the routine 200 is less accurate than the routine 100, since the widths of the resolved elements are not used in decoding the profile, the processor 60 likely can perform the routine 200 more rapidly since fewer steps are involved.

If a measured center distance correlates closely to two or more estimated center distances in the lost element matrix, and both estimated center distances correspond to the same parity, then the processor 60 under the routine 200 selects the appropriate entry, from the matrix by examining the widths of the elements bordering the measured center distance. Experimentation has shown that all resolved elements less than 1.5 times the STD correspond to resolved 2-wide elements. Therefore, if the processor 60 determines that the measured width of at least one of the bordering elements is within 1.5×STD, then the processor assumes that such an element is a 2-wide element. Knowing at lease one of the widths of the elements bordering the measured center distance allows the processor 60 to identify the appropriate column in the matrix and thus identify the correct number of lost elements.

Figure 17:
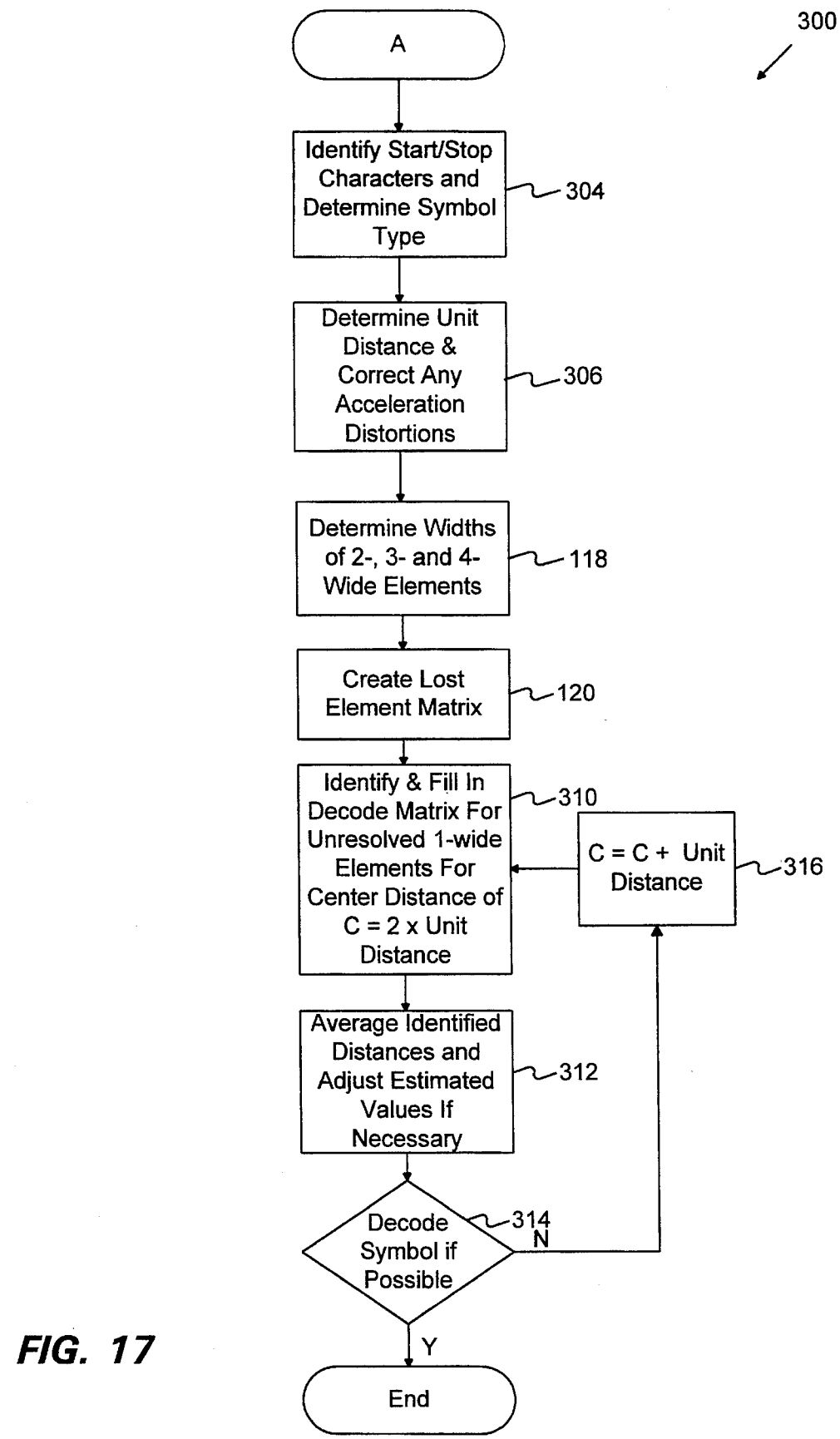
FIG. 17 shows a second alternative embodiment to the steps shown in the flowchart of FIGS. 11A and 11B.

As shown in FIG. 17, a second alternative embodiment under the present invention employs a routine 300 that corresponds closely to the steps of the routine 100 shown in FIG. 11B. Under routine 300, the processor 60 performs steps 102, 104, 106, 109, 112, 114, and 115, as described above with respect to FIG. 11A. In step 304, the processor 60 identifies the start and stop characters or left and right guard patterns, for the symbol 53, and determines the type of symbol (i.e., from which symbology the symbol belongs), based on the start and stop characters for the symbol. For example, all U.P.C.-A symbols begin and end with guard patterns consisting of two 1-wide bars enclosing a 1-wide space, and have a center guard pattern consisting of five 1-wide spaces separated by two 1-wide bars. No other symbology includes such start/stop characters or guard patterns. The processor 60 identifies a profile as being generated from a U.P.C.-A symbol if the profile contains unresolved portions at the beginning, end and middle of the profile.

Other symbologies have similar unique patterns or features which the processor 60 identifies to determine the type of symbol from which a given profile was generated even when the profile results from some unresolved elements. All Code 93 symbols have a stop character that has a 4-wide bar separated from the quiet zone by two 1-wide elements. The processor 60 determines that a given unresolved profile was generated from a Code 93 symbol by identifying a large valley (the large bar) at the end of the profile next to a high peak (the quiet zone).

All PDF417 symbols have start and stop characters that each begin with the largest width bar available in that symbology, i.e., an 8-wide bar. In analyzing a given profile, the processor 60 in step 304 readily identifies a PDF417 profile by locating the very large valleys at the beginning and end of the profile. If the profile contains such large valleys at the beginning and end of the profile, the processor 60 determines that the profile was generated from a PDF417 symbol.

After identifying the start/stop characters and determining the type of symbol, the processor 60, in step 306, determines if the profile includes acceleration distortions. Acceleration distortions are generally produced when movement of the reading beam was accelerated across the symbol as the profile was generated. Acceleration distortions are common in profiles generated from hand-held wand readers, but such distortions are less common in laser scanning and image-based readers.

The processor 60 determines if a profile includes acceleration distortion by comparing the dimensions of the start character to the dimensions of the stop character, and/or these dimensions to the overall dimensions of the profile. For the symbol 53, the processor 60 compares the distance between the beginning of the profile to its middle, and the middle of the profile to its end. The processor 60 can locate the middle of the profile in FIG. 2B by locating the area in which many (at least five) 1-wide elements are unresolved (corresponding to the center guard pattern). If the distance from the beginning of the profile to its center differs significantly from the distance of the center of the profile to its end, the processor 60 applies a compensation factor, using known techniques, to compensate for the acceleration distortion.

Similar methods of determining whether a profile contains accelerations distortions are available by using the start and stop patterns from the various symbologies. For example, with PDF417 symbols, the processor 60 compares the width of the valleys in the profile produced by the 8-wide bars at the beginning and the end of the PDF417 symbol. If the two widths vary significantly, the processor 60 applies an appropriate compensation factor.

In step 306, the processor 60 also estimates the unit distance as explained above with respect to step 116. The processor 60, in step 306, can also determine the unit distance under several alternative methods. For example, all U.P.C.-A symbols have a fixed width that includes a total of 95 modules. A module is the narrowest nominal width unit of measure in a bar code symbology. A module is therefore also equal to the unit distance. If the unit distance is 9 for a given U.P.C.-A symbol, then the symbol has a total width, from the left hand edge of its left guard pattern to the right hand edge of its right guard pattern, of 9 times 95 or 855.

Consequently, if the reader 50 produces a profile with very little acceleration distortion, the processor 60 determines the unit distance by simply dividing the sum of the center distances by 97. The total center distance is divided by 97, not 95, because the two additional modules correspond to an implied 2-wide space at the quiet zone following one of the left or right guard patterns. For the profile of FIG. 14, the sum of the center distances divided by 97 provides a unit distance of approximately 8.9. If the processor 60 determines in step 306 that the profile contains acceleration distortions, however, or determines in step 304 that the profile was generated from a non-fixed width symbology, then the unit distance is determined as described above with respect to step 116 (i.e., dividing the STD by two).

Some U.P.C.-A symbols have no instances of 2-wide elements next to each other, so that the smallest center distance involves a 2-wide element next to a 3-wide element. Such a 2-3 situation can be identified by comparing the smallest center distance to the width of the elements bordering the 2-3 distance. If the widths of the elements are significantly dissimilar, then the processor 60 determines that the smallest center distance corresponds to the 2-3 situation in the manner described above. As a result, the processor 60 produces the unit distance by dividing the smallest center distance by 2.5.

A few U.P.C.-A symbols can have no 2-wide or 3-wide elements, and thus include only 4-wide resolved elements (in addition to the unresolved 1-wide elements). Under the U.P.C.-A symbology, the only characters which have only 1- and 4-wide elements correspond to "3's" and "6's," and thus symbols having only 1- and 4-wide elements have only threes and sixes for all twelve characters encoded in the symbol. The processor 60 identifies these rare symbols having only 4-wide resolved elements in step 306 by, for example, adding the bar and space crossings counts at the upper and lower closure boundaries 111 and 111' and determining if it is equal to 26. If so, such a symbol is simply decoded using an iterative process since all twelve digits are only threes and sixes and the locations of the 4-wide elements are known. Determining the locations of the narrow elements is unnecessary for such rare symbols.

Using the unit distance determined in step 106, the processor 60 determines the estimated widths of the 2-, 3- and 4-wide elements in step 118, and creates the lost element matrix in step 120. In step 310, the processor 60 creates the decode matrix (FIG. 15), and identifies and fills in the matrix for the smallest measured center distances in the profile preferably beginning with the measured, center distances in the profile that are about two times the unit distance. Therefore, for a unit distance of 9, the processor 60 identifies the measured center distances of approximately 18 in row 124 of the decode matrix. Moving from left to right in row 124, the processor 60 in step 312 examines the center distances of 18, 18, 17, 18, and so forth as the processor determines the sizes of the resolved elements bordering a measured center distance, determines the number of lost 1-wide elements therebetween, and enters these values in rows 128 and 130, respectively, as described above.

Thereafter, in step 312, the processor 60 averages the estimated widths of the like resolved elements analyzed during step 310 to update the estimated widths for like 2-, 3- and 4-wide elements in Table 1. For example, the first measured center distance of 18 is between a space having a measured width of 15 and a bar having a measured width of 12, while the next measured center distance of 18 is between the 12 wide bar and a space having a measured width of 14. Averaging the measured widths of 15 and 14 for just these two spaces, the processor 60 computes an estimated width for a 2-wide space of 14.5. The processor 60 continues to average all of the previously analyzed 2-wide spaces together, averages all 3-wide spaces together, 4-wide spaces together, and likewise for all similar 2-, 3- and 4- bars. The processor 60 updates Table 1 to indicate more accurate estimated widths for the resolved elements in the profile. For example, considering just the two 2-wide spaces averaged above, the processor 60 updates Table 1 to change the estimated width of a 2-wide space from 15.5 to 14.5.

The processor 60 in step 312 also averages the center distances examined in step 310 to compute a new unit distance, and updates Table 4 if the estimated center distances differ from those previously set forth in Table 4. For example, the first two smallest center distances in row 124 are 18 and 18. Averaging these measured center distances and dividing the result by 2 produces a unit distance of 9. Therefore, the processor 60 does not update the estimated center distances in Table 4 (since these distances previously were produced from the same unit distance of 9).

In step 314, the processor 60 determines if the resulting string of element widths in row 132 can be parsed into characters, as in row 134, and the symbol 53 decoded using known techniques. If the processor 60 has not identified all lost elements in the profile and thus cannot decode the symbol 53 in step 314, the routine 300 proceeds to steps 316 and 310 where the processor identifies and fills in the decode matrix for measured center distances equal to approximately the previously selected measured distance plus the unit distance. For this example, the processor 60 identifies all measured center distances equal to approximately three times the unit distance (i.e., 27), and identifies all lost 1-wide elements within such measured center distances, between the measured widths of resolved elements. In step 312, the processor 60 averages the measured widths of the like resolved elements just previously analyzed with the measured widths previously averaged when the measured centers distances of approximately 18 were analyzed. If any of the resulting averages of all like resolved elements that have been analyzed by the processor 60 differ from the estimated widths in Table 1, the processor updates the entries in Table 1 as described above.

Thereafter, the processor 60 attempts to decode the profile from symbol 53 in step 314. If the symbol 53 still cannot be decoded in step 314, the routine 300 loops back through steps 316, 310, 312, and 314 as the processor 60 analyzes the measured center distances of values incremented by the unit distance through each iteration of steps 310, 312, 314, and 316. Such iterative calculation and averaging under routine 300 may provide a more accurate representation of the estimated center distances, unit distance, and estimated element widths, and thus provides a more accurate decoding method for a closure profile. Importantly, any error that the processor 60 initially computes for the unit distance, or other estimated widths/distances, is not carried forward and exaggerated as Tables 1 and 4 are created and filled in for larger width elements or center distances.

To summarize, the present invention provides a method of reading a given machine-readable symbol at distances significantly beyond the normal range of resolution of a given reader, reading symbols with X dimensions smaller than a given X dimension normally readable by a given reader, and reading profiles containing noise (created by, e.g., electrical noise or printing defects). The present invention does not depend on complex mathematics and can be used with all processor controlled readers having any type of optical configuration (e.g., laser scanners, wands, CCD imagers, etc.). By simply analyzing the reflectance information, the location of the centers of resolved wide elements, and the widths of the resolved elements at the closure boundary, the narrow elements in a given symbol are redundant, and therefore, are not required to decode the symbol under the present invention. As a result, the present invention can decode a profile exhibiting such closure that none of the 1-wide elements are recognizable in the profile. The present invention relies on the distances between the centers of resolved elements, rather than the edges of these elements, in a profile. Consequently, the method of the present invention is immune to ambiguity associated with standard decoding methods that use on edge-to-edge measurements in a profile. Additionally, the present invention can decode profiles that contain a significant amount of noise, such that the edges of elements in the profile cannot be found under standard decoding methods.

Those skilled in the art will recognize that the above-described invention provides a method of decoding unresolved profiles produced from machine-readable symbols. Although specific embodiments of, and examples for, the present invention have been described for purposes of illustration, various equivalent modifications can be made without departing from the spirit and scope of the invention. For example, the number of 1-wide elements lost within the center of a U.P.C.-A symbol, which includes a center guard pattern, can be difficult to determine, and thus, the present invention can ignore this center region and decode the remaining portions of the symbol. Thereafter, preferably after performing iterative calculations as described with respect to FIG. 17, the processor 60 then determines the number of lost elements within the center portion of the profile using the above-described method. Alternatively, in profiles lacking acceleration distortions, to determine the number of narrow elements lost within the center of the profile, the processor 60 can identify all other resolved elements by adding the total number of identified 1-wide elements that were lost, and then subtracting this number from 95.

Figure 18:
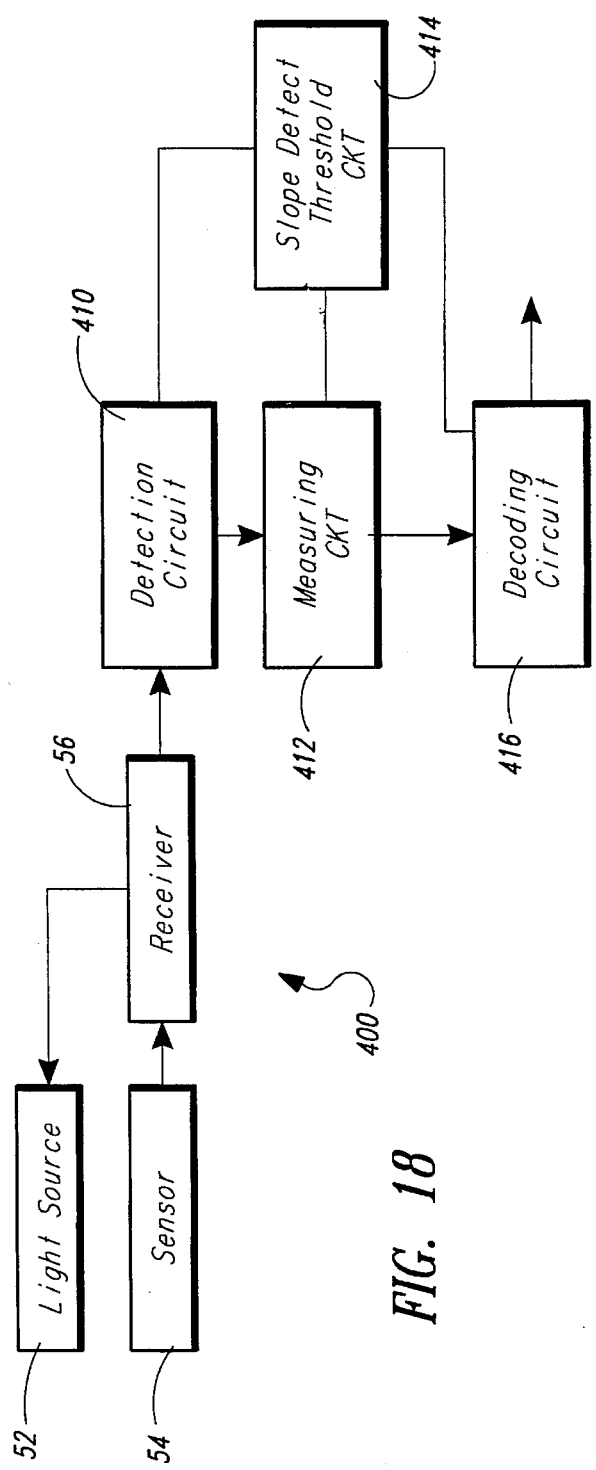
FIG. 18 shows a block diagram of an alternative data collection symbology reader under the present invention.

While the present invention has been described above with respect to a method performed by the processor 60, the routines 100, 200 and 300 may be implemented using appropriate circuitry. As shown in FIG. 18, a reader 400 includes the light source 52, sensor 54 and receiver 56 as described above. A detection circuit 410 receives the profile produced by the receiver 56, and detects which portions of the profile correspond to resolved wide elements. As described above for steps 109 and 112, the detection circuit 410 establishes upper and lower closure boundaries as described above, analyzes the profile to determine which portions of the profile extend above or below the boundaries, and produces a resolved element signal.

A measuring circuit 412 receives the resolved element signal and measures the center distances between the elements (as in step 114). The measuring circuit 412 also measures the width of resolved elements at the closure boundaries and determines whether a given measured element width corresponds to a 2-, 3- or 4-wide element (steps 115 and 118). A slope detection circuit 414 can be used in addition to, or in lieu of, the detection circuit 410 to determine which elements are resolved and determine whether no 1-wide elements are lost (as described above in step 212). Additionally, the circuit 414 may operate with, or in lieu of, the detection circuit 410 to establish the upper and lower closure boundaries (step 109).

A decoding circuit 416 essentially performs steps 116, 120 and 122 as described above with respect to the lost element matrix and determines the number and location of 1-width elements lost within the profile. The decoding circuit 416 may thereby decode the signal (step 133) after having determined the location and number of lost 1-wide elements within the profile. The decoding circuit 416 can be a microprocessor and can determine whether a measured element is a 2-, 3- or 4-wide element (instead of the measuring circuit 412).

Additionally, while the routines 100, 200 and 300 are described as determining the number of lost elements in a profile based the center distances and the widths of all resolved elements at the closure boundary, those skilled in the art can modify the present invention based on the detailed description provided herein to allow the present invention to determine the number of lost 1-wide elements based on the measured center distances and the estimated widths of only the 2-wide elements. Furthermore, the lost element decode matrices are shown and described above as having a certain depicted form (i.e., Tables 2 through 4 and FIG. 15). The present invention need not construct such matrices per se, as shown above, but instead simply performs the necessary routines and calculations described herein in order to decode unresolved profiles such as counting a number of loops in an interactive process to determine the number of lost elements. Accordingly, the present invention is not limited by the disclosure, but instead its scope is to be determined entirely by reference to the following claims.

I claim:

1. A method of decoding a bar code symbol representing encoded information, the bar code symbol including a plurality of relatively spaced bars having at least first, second and third widths, and spaces between the bars having at least first, second and third widths, the second and third widths being greater than the first width, the method comprising the steps of:

receiving light reflected from the bar code symbol and producing an output signal therefrom that represents the reflectance of the bars and spaces comprising the bar code symbol;

receiving the output signal and producing a wide feature signal resolving the bars and spaces having the second and third widths, but the wide feature signal failing to resolve at least some of the bars and spaces having the first width;

receiving the wide feature signal and determining which of the bars and spaces are resolved by defining a threshold and identifying a plurality of portions in the wide feature signal that extend beyond the threshold, each of the plurality of portions corresponding to one of the resolved bars and spaces;

measuring distances between the plurality of portions in the wide feature signal;

determining a narrow width of the bars and spaces having the first width based on the distances measured;

determining a number and location of the bars and spaces having the first width based on the determined width and the distances measured; and determining the information encoded in the bar code symbol based on the determined number and location of bars and spaces having the first width.

2. The method of claim 1 wherein the step of measuring distances includes the steps of:

identifying a center for each of the plurality of portions; and measuring distances between the centers of the plurality of portions.

3. The method of claim 2 wherein the step of determining a narrow width of the bars and spaces having the first width includes the steps of:

identifying a smallest center distance between the centers of the plurality of portions; and dividing the smallest center distance by a first predetermined amount to determine the narrow width.

4. The method of claim 3 wherein the step of determining a narrow width of the bars and spaces having the first width includes the steps of:

measuring a width for first and second portions of the plurality of portions having the smallest center distance;

determining that the widths of the first and second portions are substantially unequal; and dividing the smallest center distance by a second predetermined amount to determine the narrow width.

5. The method of claim 2 wherein the step of determining a number and location of the bars and spaces having the first width includes the steps of:

creating a lost element matrix that identifies a number of the bars and spaces having the first width that are unresolved between resolved bars and spaces, the lost element matrix being created based on estimated center distances between the resolved bars and spaces and the determined narrow width: and determining the number and location of the bars and spaces having the first width by comparing the center distances measured with respect to the plurality of portions in the wide feature signal to the estimated center distances in the lost element matrix.

6. The method of claim 5, further comprising the steps of:

examining first and second portions of the plurality of portions having a given distance measured between the centers of the first and second portions; and determining if a parity of a given number of bars and spaces having the first width correlates to the examined first and second portions.

7. The method of claim 6, further comprising the steps of:

creating a decode matrix that identifies the number of bars and spaces having the first width that are unresolved between the resolved bars and spaces in the wide feature signal; and filling in the decode matrix with the identified number of the bars and spaces having the first width if the parity correlates.

8. The method of claim 5 wherein the step of determining a number and location of the bars and spaces having a first width includes the steps of:

selecting a first and a second set of center distances measured with respect to the plurality of portions;

determining the number and location of the bars and spaces having a first width by comparing the first set of center distances to the estimated center distances in the lost element matrix;

updating the estimated center distances in the lost element matrix; and determining the number and location of the bars and spaces having the first width by comparing the second set of measured center distances to the updated center distances in the lost element matrix.

9. The method of claim 2, further comprising the step of measuring a width for each of the plurality of portions.

10. The method of claim 9 wherein the step of measuring a width measures a width for each portion at the threshold.

11. The method of claim 9, further comprising the step of estimating a width of the bars and spaces having the second and third widths based on at least one of the widths measured for the plurality of portions.

12. The method of claim 11 wherein the step of estimating a width includes the step of averaging a selected number of the widths measured for each portion.

13. The method of claim 11 wherein the step of determining a number and location of the bars and spaces having the first width includes the step of determining whether the measured width for each portion corresponds to the second or third width, based on the estimated widths for the bars and spaces having the second and third widths.

14. The method of claim 1 wherein the step of receiving the wide feature signal includes the steps of:

producing the wide feature signal so as to represent reflectance values for at least the resolved bars and spaces;

determining a number of times the wide feature signal exceeds each of a plurality of reflectance values;

examining the number of times to determine a first range of reflectance values at which the wide feature signal exceeds several of the plurality of reflectance values over a given number of times; and defining the threshold as including a first selected reflectance value from the first range of reflectance values.

15. The method of claim 14 wherein the step of receiving the wide feature signal includes the steps of:

examining the number of times to determine a second range of reflectance values at which the wide feature signal exceeds another several of the plurality of reflectance values over a selected number of times; and defining the threshold as including a second selected reflectance value from the second range of reflectance values, the first selected reflectance value identifying a first plurality of portions corresponding to the resolved bars, and the second selected reflectance value identifying a second plurality of portions corresponding to the resolved spaces.

16. The method of claim 15 wherein the steps of determining first and second ranges define a closure region of reflectance values therebetween, and wherein the steps of defining the threshold defines respective first and second selected reflectance values that are approximate to the reflectance values of the closure region.

17. The method of claim 16 wherein the steps of defining the first and second selected reflectance values defines the first and second selected reflectance values at a chosen offset value from the reflectance values of the closure region.

18. The method of claim 15 wherein the steps of defining the first and second selected reflectance values define first and second constant values.

19. The method of claim 1 wherein the step of receiving the wide feature signal includes the steps of:

producing the wide feature signal so as to represent reflectance values for at least the resolved bars and spaces;

determining a mean reflectance value based on the wide feature signal; and defining the threshold as having at least a selected reflectance value based on the mean reflectance value.

20. The method of claim 1 wherein the step of determining a narrow width of the bars and spaces having the first width includes the steps of:

determining a sum of the measured distances; and dividing the sum by a predetermined amount to determine the narrow width.

21. The method of claim 1, further comprising the steps of:

identifying start or stop characters in the bar code symbol based on the wide feature signal; and determining a type of symbology from which the bar code symbol was generated based on the identified start or stop characters in the bar code symbol.

22. The method of claim 1, further comprising the steps of:

identifying start or stop characters in the bar code symbol based on the wide feature signal;

determining if the wide feature signal includes an acceleration distortion by comparing a distance between the plurality of portions in the wide feature signal; and applying a compensation factor to the wide feature signal to compensate for the acceleration distortion.

23. The method of claim 1 wherein the step of determining a narrow width of the bars and spaces having the first width comprises the steps of:

averaging at least a few of the distances measured between the plurality of portions that correspond to the bars or spaces having the second width to produce an average value; and dividing the average value by a predetermined amount to determine the width of the bars and spaces having the first width.

24. The method of claim 1, further comprising the steps of:

determining if all of the bars and spaces having a first, second and third widths are resolved in the wide feature signal, before the step of receiving the wide feature signal; and decoding the wide feature signal if all of the bars and spaces having the first, second and third widths are resolved.

25. The method of claim 24 wherein the step of determining if the wide feature signal resolves the bars and spaces having the first, second and third widths includes the steps of:

determining a number of times the wide feature signal exceeds each of a plurality of reflectance values; and examining the number of times and determining that the wide feature signal fails to resolve the bars and spaces having the first width if the wide feature signal exceeds a range of reflectance values over a given number of times.

26. The method of claim 25 wherein the bar code symbol is a U.P.C.-A symbol, and wherein the given number of times is 60.

27. A method of decoding a machine-readable symbol representing encoded information, the symbol including a plurality of relatively spaced two-dimensional geometric shapes, the shapes and spaces between the shapes having at least first, second and third widths in at least one dimension, the second and third widths being greater than the first width, the method comprising the steps of:

receiving light reflected from the symbol and producing an output signal therefrom that represents the reflectance of the shapes and spaces comprising the symbol;

receiving the output signal and producing a wide feature signal that resolves at least some of the shapes and spaces having the second and third widths, but which fails to resolve at least some of the shapes and spaces having the first width;

receiving the wide feature signal and determining which of the shapes and spaces are resolved by identifying a plurality of portions in the wide feature signal that correspond to the resolved shapes and spaces;

generating a lost element matrix in response to the wide feature signal; and determining the information encoded in the symbol based on the lost element matrix.

28. The method of claim 27 wherein the step of receiving the wide feature signal includes the step of defining a threshold and identifying the plurality of portions in the wide feature signal that extend beyond the threshold as the resolved shapes and spaces.

29. The method of claim 27 wherein the step of receiving the wide feature signal includes the steps of:

determining a slope for each of the plurality of portions in the wide feature signal; and determining which of the shapes and spaces are resolved based on the determined slopes.

30. The method of claim 29, further comprising the step of determining that zero shapes and spaces having the first width are unresolved adjacent to shapes or spaces having the second or third widths based on the determined slopes of the plurality of portions representing the shapes or spaces having the second or third widths.

31. The method of claim 27, further comprising the step of measuring a distance with respect to each of the plurality of portions in the wide feature signal.

32. The method of claim 31 wherein the step of generating a lost element matrix includes the steps of:

creating a lost element matrix that identifies a number of the shapes and spaces having the first width that are unresolved between the resolved shapes and spaces, the lost element matrix being created based on estimated distances between the plurality of portions in the wide feature signal; and determining a number and location of the shapes and spaces having the first width by comparing the distances measured with respect to the plurality of portions in the wide feature signal to the estimated distances in the lost element matrix.

33. The method of claim 30 wherein the step of generating a lost element matrix includes the steps of:

examining first and second portions in the wide feature signal that have a given distance measured between the first and second portions; and matching a parity of a given number of shapes and spaces having the first width to the examined first and second portions.

34. The method of claim 30 wherein the step of measuring a distance includes the steps of:

identifying a center for each of the plurality of portions; and measuring distances between the centers of the plurality of portions.

35. The method of claim 27, further comprising the step of determining a width of the shapes and spaces having the first width based on the wide feature signal.

36. The method of claim 35 wherein the step of determining the width of the shapes and spaces having the first width includes the steps of:

measuring at least one distance with respect to the plurality of portions in the wide feature signal; and dividing the measured distance by a predetermined amount to determine the width of the shapes and spaces having the first width.

37. The method of claim 27 wherein the step of receiving the wide feature signal includes the steps of:

analyzing the wide feature signal to define a closure region; and identifying the plurality of portions in the wide feature signal that correspond to the resolved shapes and spaces as the plurality of portions outside of the closure region.

38. The method of decoding a profile produced from a machine-readable symbol that represents encoded information, the symbol including a plurality of relatively spaced two-dimensional geometric shapes, the shapes and spaces between the shapes having at least first, second and third widths in at least one dimension, the second and third widths being greater than the first width, the profile resolving at least some of the shapes and spaces having the second and third widths, but failing to resolve at least some of the shapes and spaces having the first width, the method comprising the steps of:

determining which of the shapes and spaces are resolved by identifying a plurality of portions in the profile that correspond to the resolved shapes and spaces;

determining a number and location of the shapes and spaces having the first width based on the plurality of portions identified in the profile; and determining the information encoded in the symbol based on the plurality of portions and number and location of the shapes and spaces having the first width.

39. An apparatus for decoding a machine-readable symbol representing encoded information, the machine-readable symbol including a plurality of relatively spaced two-dimensional shapes, the geometric shapes and spaces between the shapes having first, second and third widths in at least one dimension, the second and third widths being greater than the first width, the apparatus comprising:

a sensor that receives light that is reflected from the machine-readable symbol and produces an output signal therefrom that represents the reflectance of the shapes and spaces comprising the symbol;

a receiver that receives the output signal and produces a large shape signal indicative of at least some of the shapes or spaces having the second or third widths, but failing to produce a signal indicative of at least some of the shapes and spaces having the first width; and a processor for processing the large shape signal and producing a signal indicative of the information encoded in the symbol, the processor (i) determining which of the shapes and spaces are resolved by identifying a plurality of portions in the large shape signal that each correspond to one of the resolved shapes and spaces, (ii) generating a lost element matrix in response to the large shape signal, and (iii) producing a signal indicative of the information encoded in the symbol based on the lost element matrix.

40. The apparatus of claim 39 wherein the processor defines a threshold with respect to the large shape signal and identifies the plurality of portions in the wide feature signal that each correspond to one of the resolved shapes and spaces as the plurality of portions that extend beyond the threshold.

41. The apparatus of claim 39 wherein the processor determines a slope for each of the plurality of portions in the large shape signal and determines which of the shapes and spaces are resolved based on the determined slopes.

42. The apparatus of claim 39 wherein the processor measures distances between each of the plurality of portions in the large shape signal.

43. The apparatus of claim 42 wherein the lost element matrix identifies a number of the shapes and spaces having the first width that are unresolved between the resolved shapes and spaces, wherein the processor generates the lost element matrix based on estimated distances between the plurality of portions in the large shape signal, and wherein the processor produces the signal indicative of the information encoded in the symbol by determining a number and location of the shapes and spaces having the first width by comparing the distances measured with respect to the plurality of portions in the large shape signal to the estimated distances in the lost element matrix.

44. The apparatus of claim 42 wherein the processor measures distances by identifying a center for each of the plurality of portions in the large shape signal and measuring distances between the centers of the plurality of portions.

45. The apparatus of claim 39 wherein the processor determines a width of the shapes and spaces having a first width based on the large shape signal.

46. The apparatus of claim 45 wherein the processor determines the width of the shapes and spaces having the first width by measuring at least one distance with respect to the plurality of portions in the large shape signal, and dividing the measured distance by a predetermined amount to determine the width of the shapes and spaces having the first width.

47. The apparatus of claim 39 wherein the processor determines which of the shapes and spaces are resolved by defining a closure region with respect to the large shape signal and identifying the plurality of portions in the large shape signal that are outside of the closure region as the resolved shapes and spaces.

48. The apparatus of claim 39 wherein the processor defines a threshold with respect to the large shape signal and measures a width for each of the plurality of portions at the threshold.

49. The apparatus of claim 48 wherein the processor determines which of the resolved shapes and spaces have the second width and which of the shapes and spaces have the third width based on the measured widths of the plurality of portions.

50. An apparatus for decoding a machine-readable symbol representing encoded information, the machine-readable symbol including a plurality of relatively spaced two-dimensional shapes, the geometric shapes and spaces between the shapes having first, second and third widths in at least one dimension, the second and third widths being greater than the first width, the apparatus comprising:

a sensor that receives light that is reflected from the machine-readable symbol and produces an output signal therefrom that represents the reflectance of the shapes and spaces comprising the symbol;

a receiver that receives the output signal and produces a large shape signal indicative of at least some of the shapes or spaces having the second or third widths, but failing to produce a signal indicative of at least some of the shapes and spaces having the first width;

a detection circuit that determines which of the shapes and spaces are resolved by identifying a plurality of portions in the large shape signal that each correspond to one of the resolved shapes and spaces;

a first measuring circuit that generates a distance signal indicating distances between each of the plurality of portions in the large shape signal; and a decoding circuit that determines a number and location of the shapes and spaces having a first width by analyzing the distance signal, and therefrom produces a signal indicative of the information encoded in the symbol.

51. The apparatus of claim 50, further comprising a slope detection circuit that generates a slope signal for each of the plurality of portions in the large shape signal, the slope signal indicating which of the shapes and spaces are resolved.

52. The apparatus of claim 50, further comprising a thresholding circuit that defines a threshold with respect to the large shape signal and identifies the plurality of portions in the wide feature signal that correspond to one of the resolved spaces and shapes as the plurality of portions that extend beyond the threshold; and a second measuring circuit that measures a width for each portion at the threshold and produces a measuring signal, the measuring signal indicating which of the resolved shapes and spaces correspond to shapes and spaces having the second width and which of the resolved shapes and spaces have the third width.

53. The apparatus of claim 50 wherein the decoding circuit is a microprocessor.

* * * * *